United States Patent
Krabbe et al.

(10) Patent No.: US 8,578,929 B2
(45) Date of Patent: Nov. 12, 2013

(54) MODULAR PIVOTABLE SOLAR COLLECTOR ARRANGEMENT

(75) Inventors: Bernd Krabbe, Hamburg (DE); Raphael Hoffmann, Hamburg (DE); Stephan Kipper, Bielefeld (DE)

(73) Assignee: Voltwerk electronics GmbH, Hamburg (DE)

( * ) Notice: Subject to any disclaimer, the term of this patent is extended or adjusted under 35 U.S.C. 154(b) by 689 days.

(21) Appl. No.: 12/665,646

(22) PCT Filed: Jun. 21, 2007

(86) PCT No.: PCT/EP2007/005475
§ 371 (c)(1),
(2), (4) Date: Jun. 17, 2010

(87) PCT Pub. No.: WO2008/154945
PCT Pub. Date: Dec. 24, 2008

(65) Prior Publication Data
US 2010/0258110 A1 Oct. 14, 2010

(51) Int. Cl.
*F24J 2/38* (2006.01)
*H01L 31/042* (2006.01)

(52) U.S. Cl.
USPC .......... 126/605; 126/602; 126/603; 126/608; 136/244; 136/246

(58) Field of Classification Search
USPC .......... 126/602, 603, 605, 608; 136/244, 246
See application file for complete search history.

(56) References Cited

U.S. PATENT DOCUMENTS

| | | | |
|---|---|---|---|
| 4,209,231 A | 6/1980 | Sayre | |
| 4,966,631 A | 10/1990 | Matlin | |
| 5,228,924 A | 7/1993 | Barker et al. | |
| 5,632,823 A | 5/1997 | Sharan | |
| 6,662,801 B2 * | 12/2003 | Hayden et al. | 126/571 |
| 7,926,480 B2 * | 4/2011 | Le Lievre | 126/684 |
| 2003/0070705 A1 | 4/2003 | Hayden et al. | |
| 2008/0308091 A1 * | 12/2008 | Corio | 126/606 |

FOREIGN PATENT DOCUMENTS

DE 10 2005 013 334 A1 9/2006
DE 20 2006 003 476 U1 12/2006

* cited by examiner

*Primary Examiner* — Kenneth Rinehart
*Assistant Examiner* — William Corboy
(74) *Attorney, Agent, or Firm* — Kilpatrick Townsend & Stockton LLP

(57) ABSTRACT

Modular solar collector, comprising a first supporting stand, the first supporting stand having at its upper end a first pivot bearing point defining a pivotal axis, a second supporting stand, having at its upper end a second pivot bearing point of the pivotal axis, an intermediate supporting stand having at its upper end an intermediate pivot bearing point of the pivotal axis, a first solar collector unit comprising at least one solar collector panel and a first unit frame being pivotally mounted to the first pivot bearing point and an intermediate pivot bearing point, and a second solar collector unit comprising at least one solar collector panel and a second unit frame being pivotally mounted to the second pivot bearing point and an intermediate pivot bearing point, a pivotal drive assembly comprising an x-drive unit and an x-coupling wherein each unit frame is, mechanically coupled to its adjacent unit frame.

23 Claims, 15 Drawing Sheets

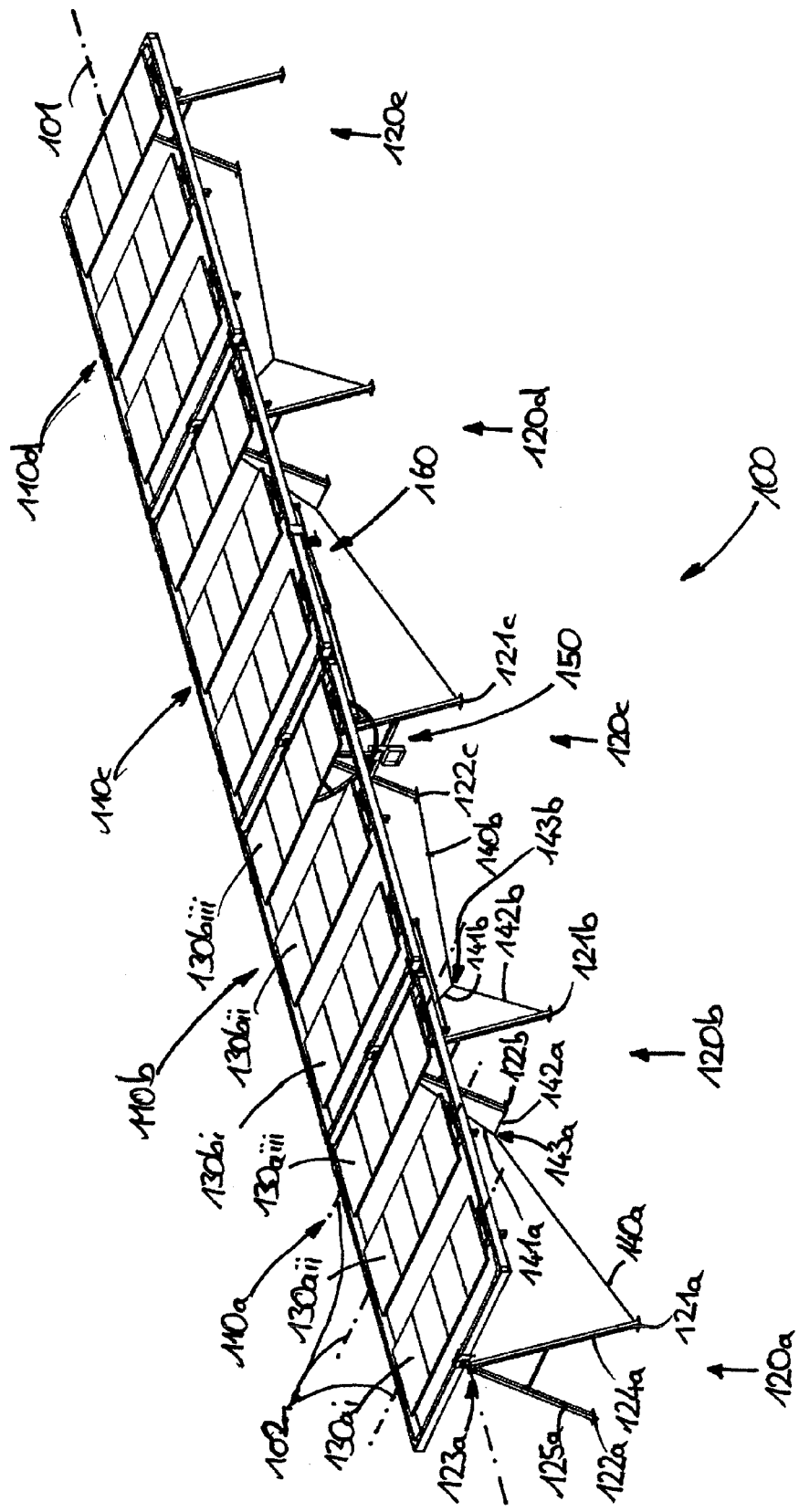

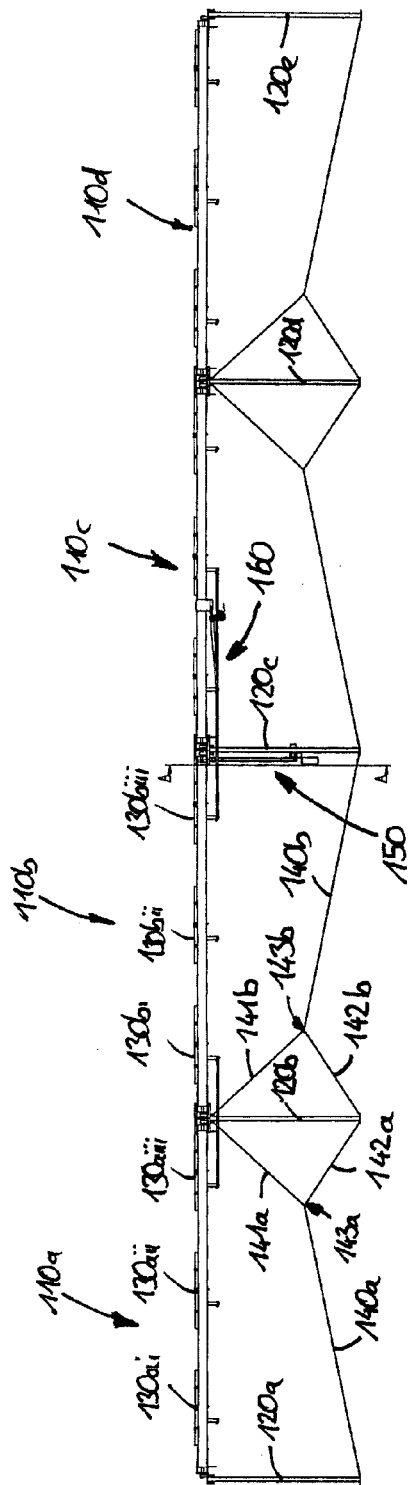
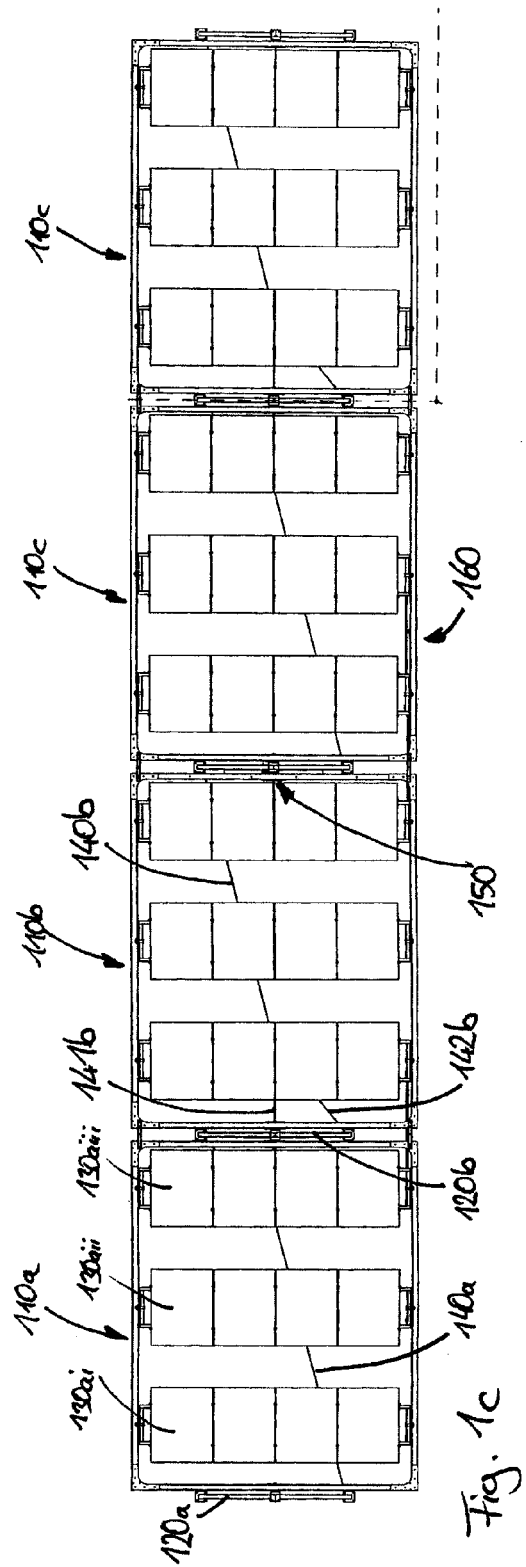

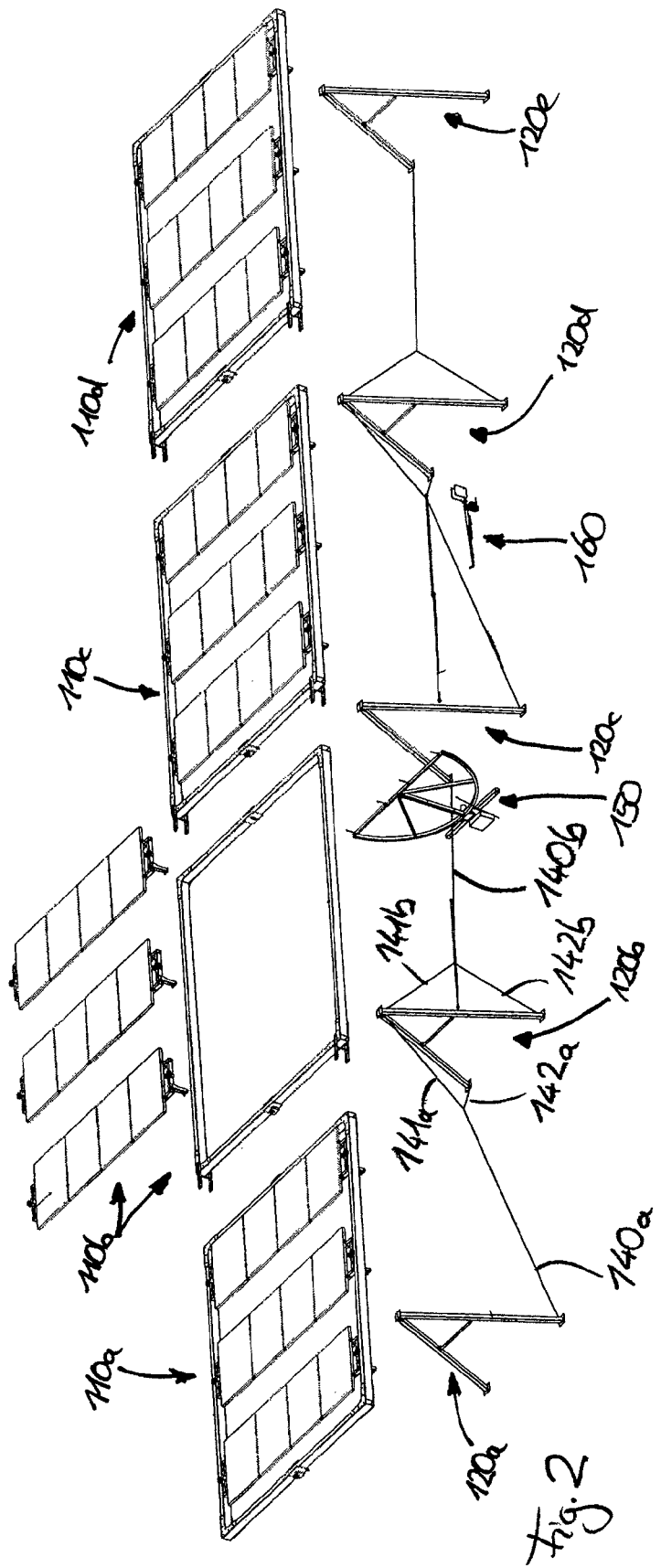

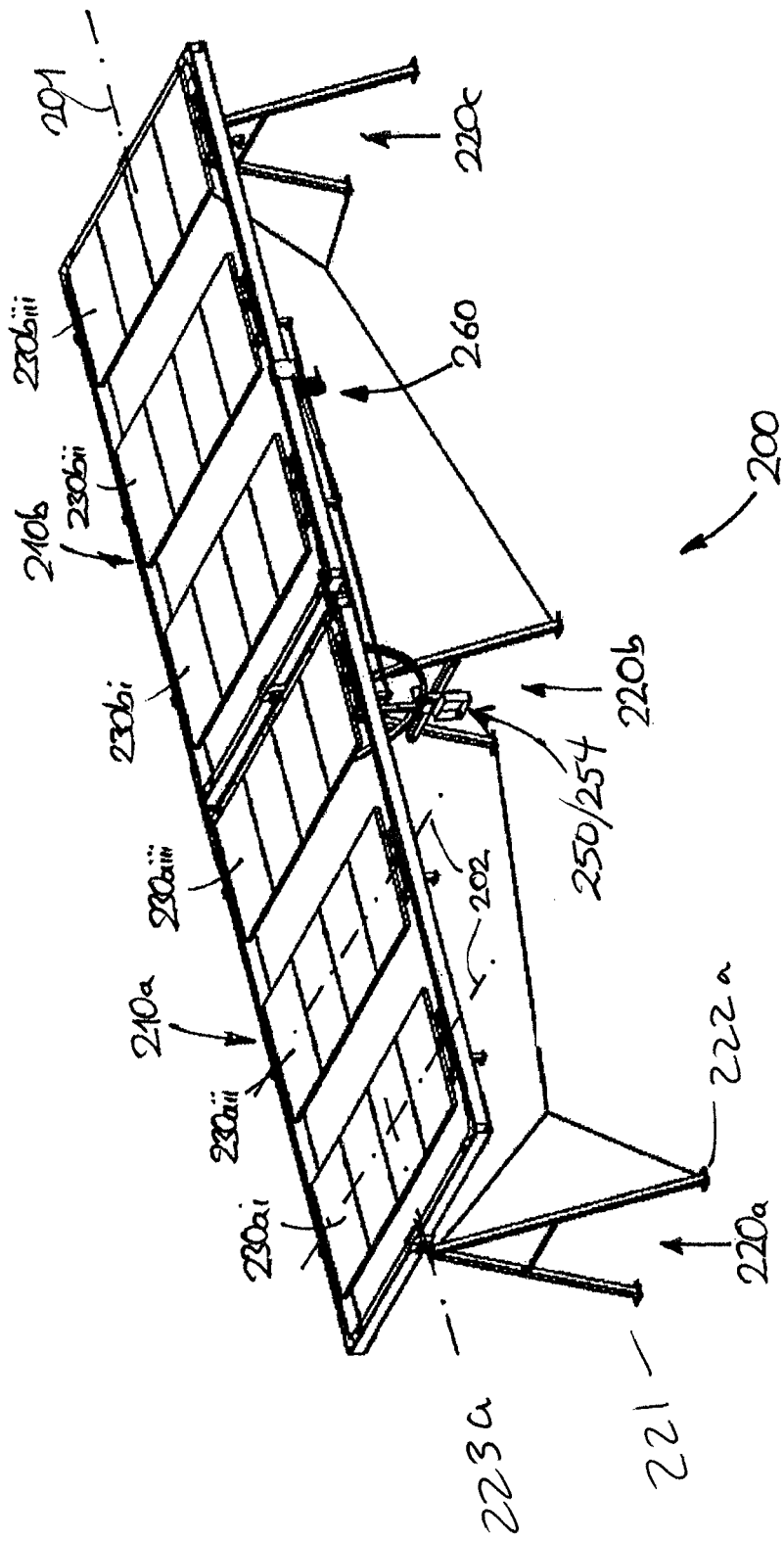

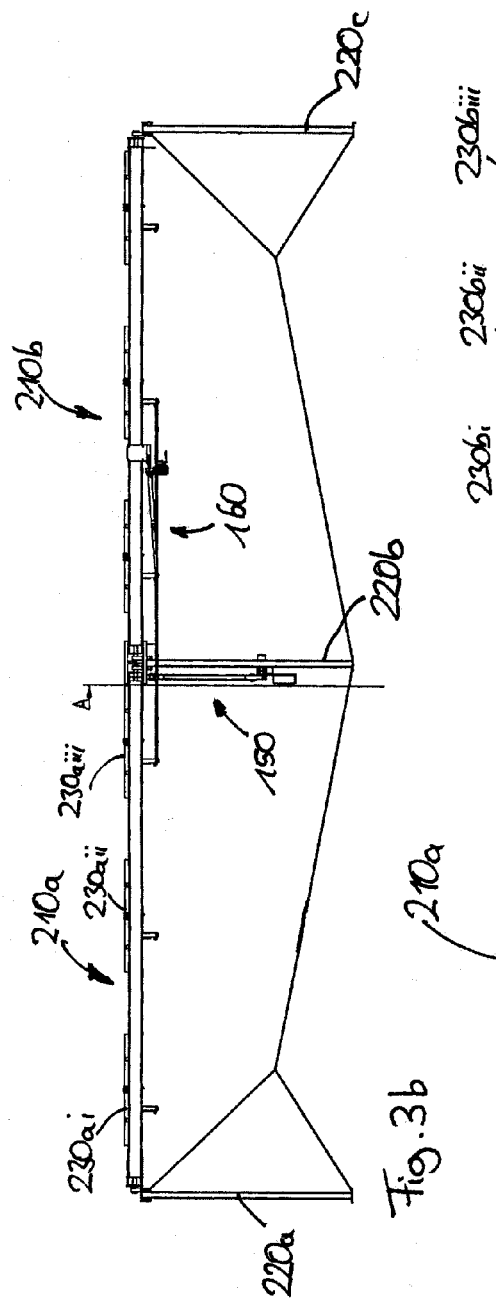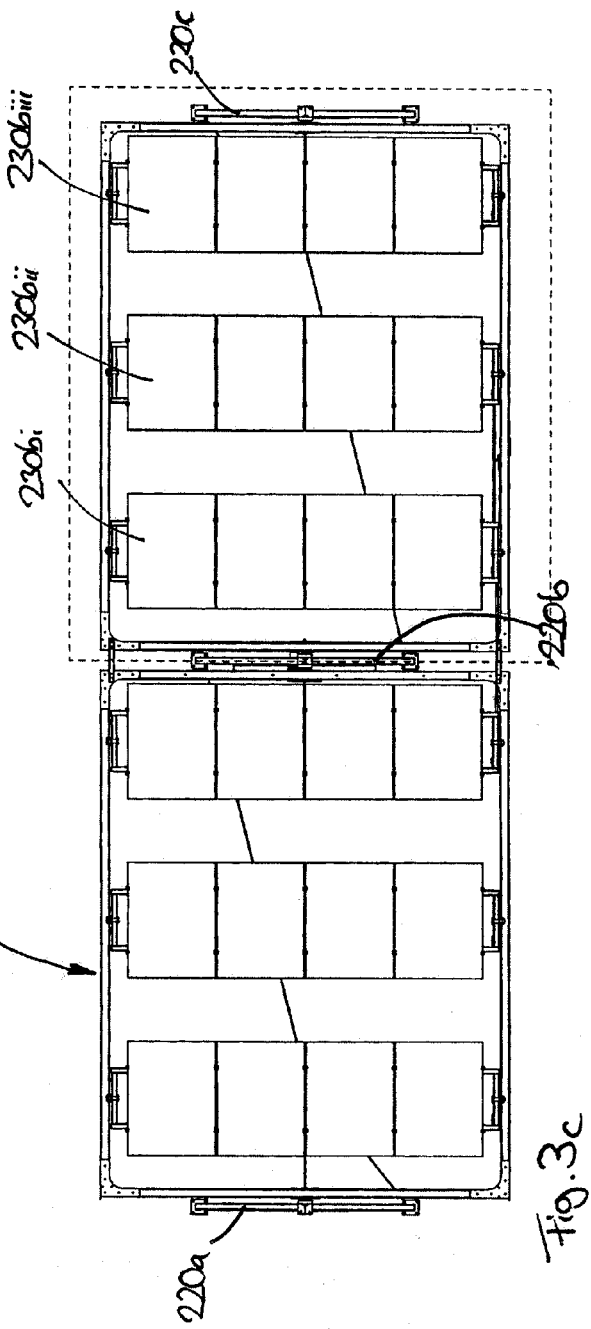
Fig. 3b
Fig. 3c

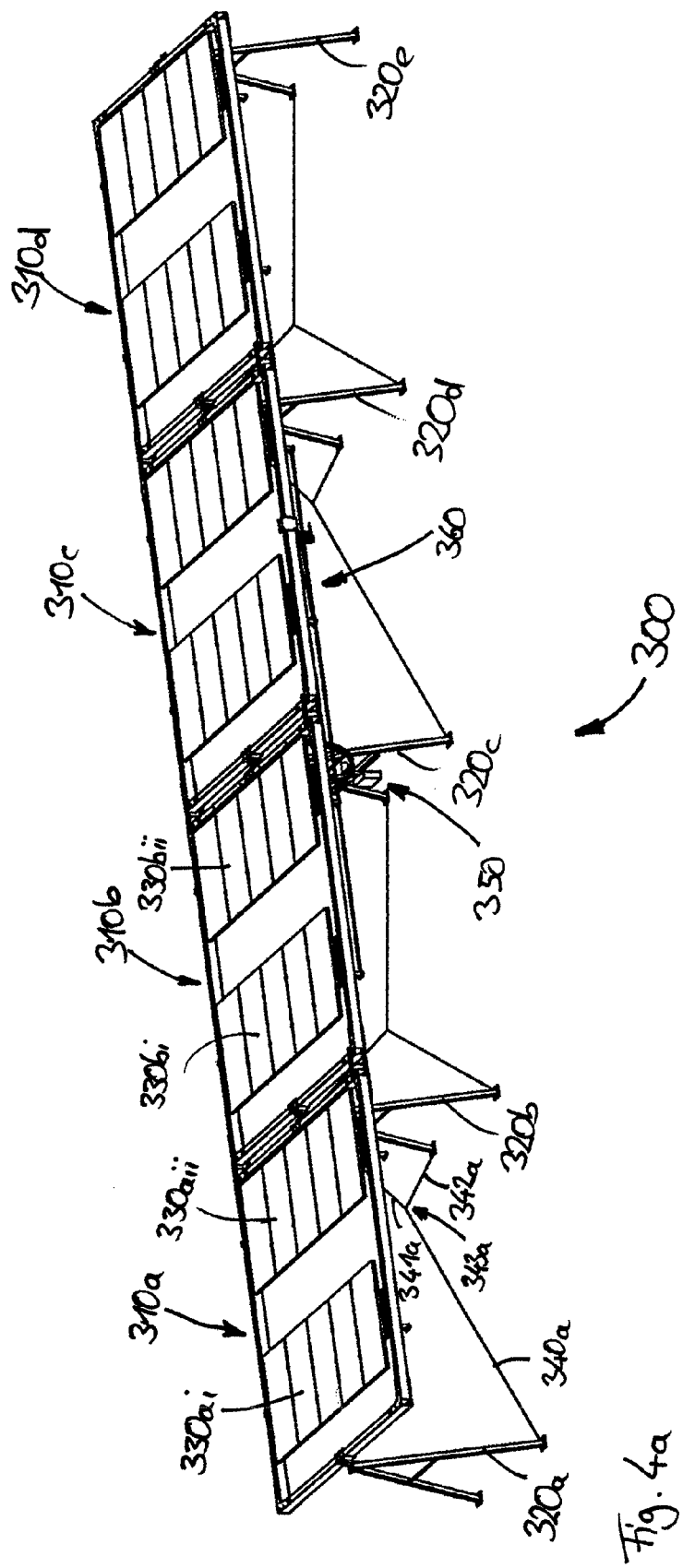

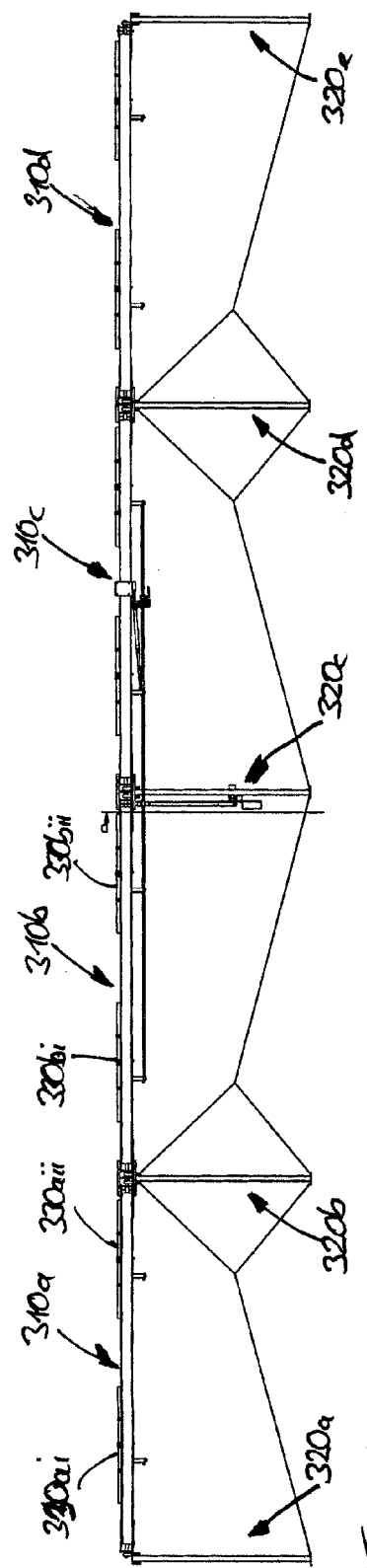
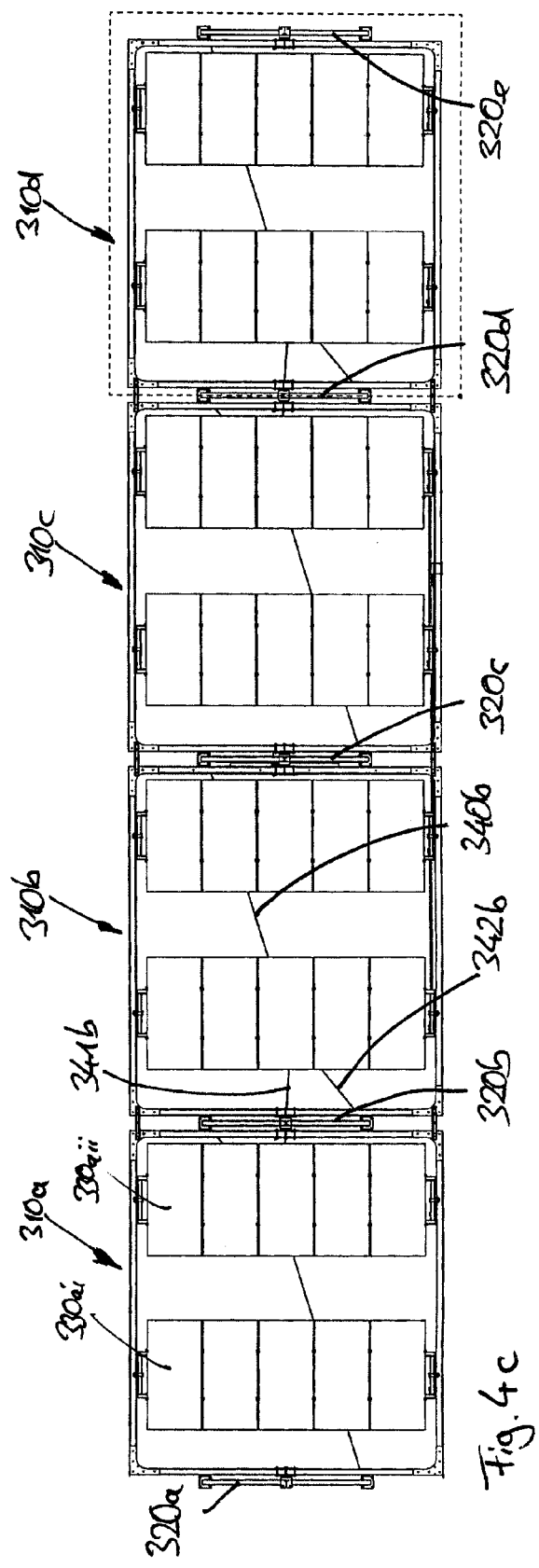

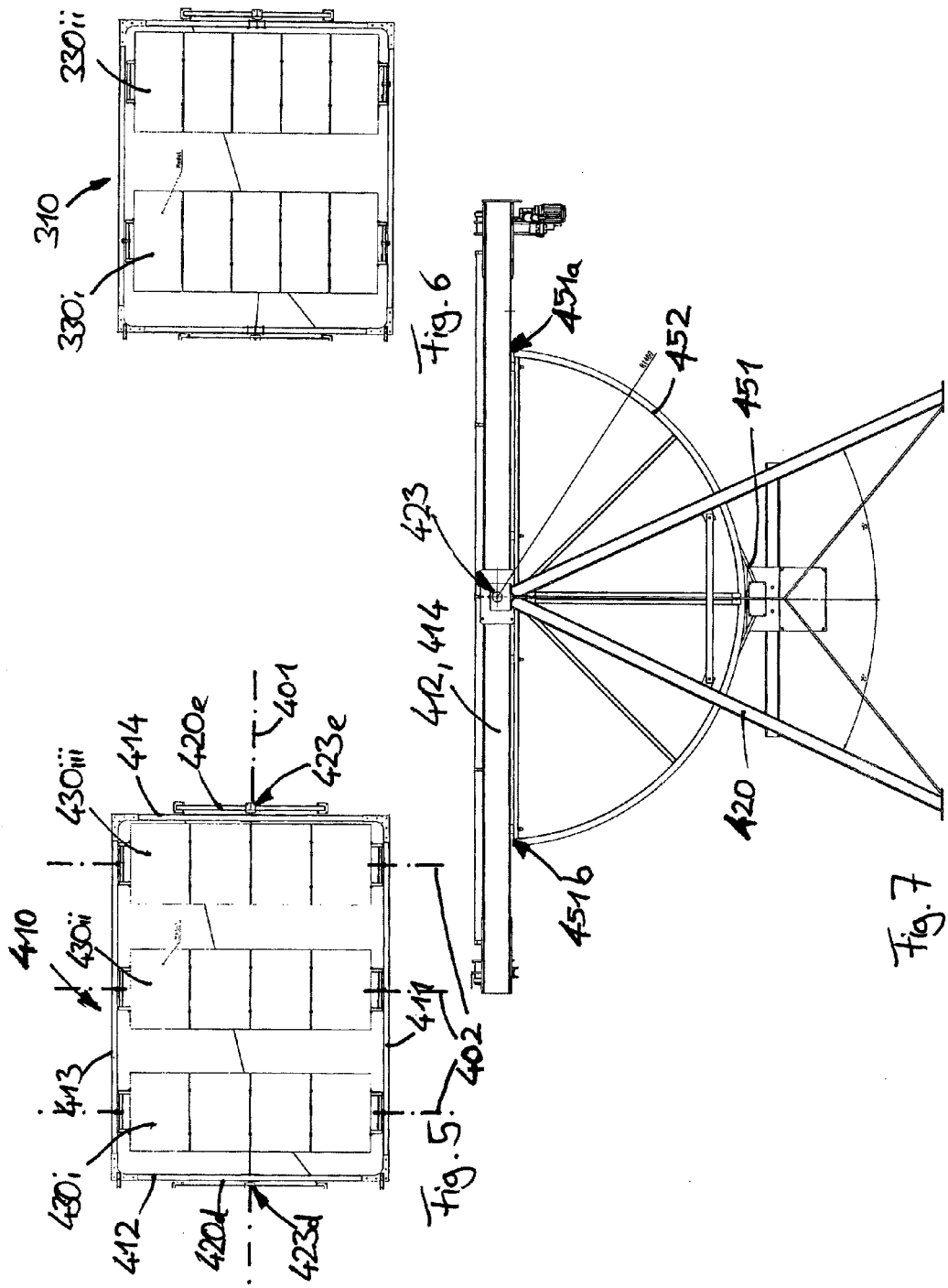

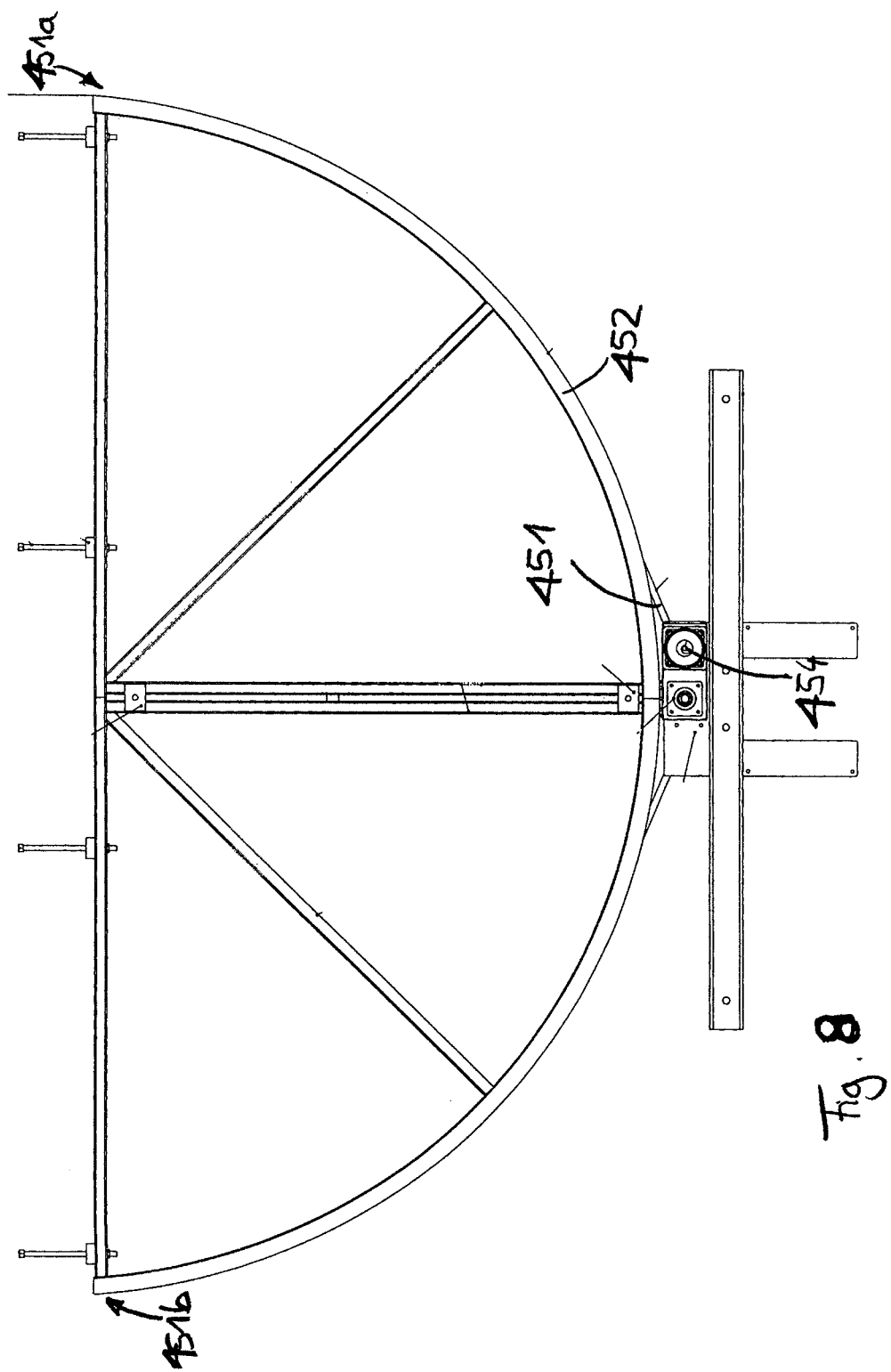

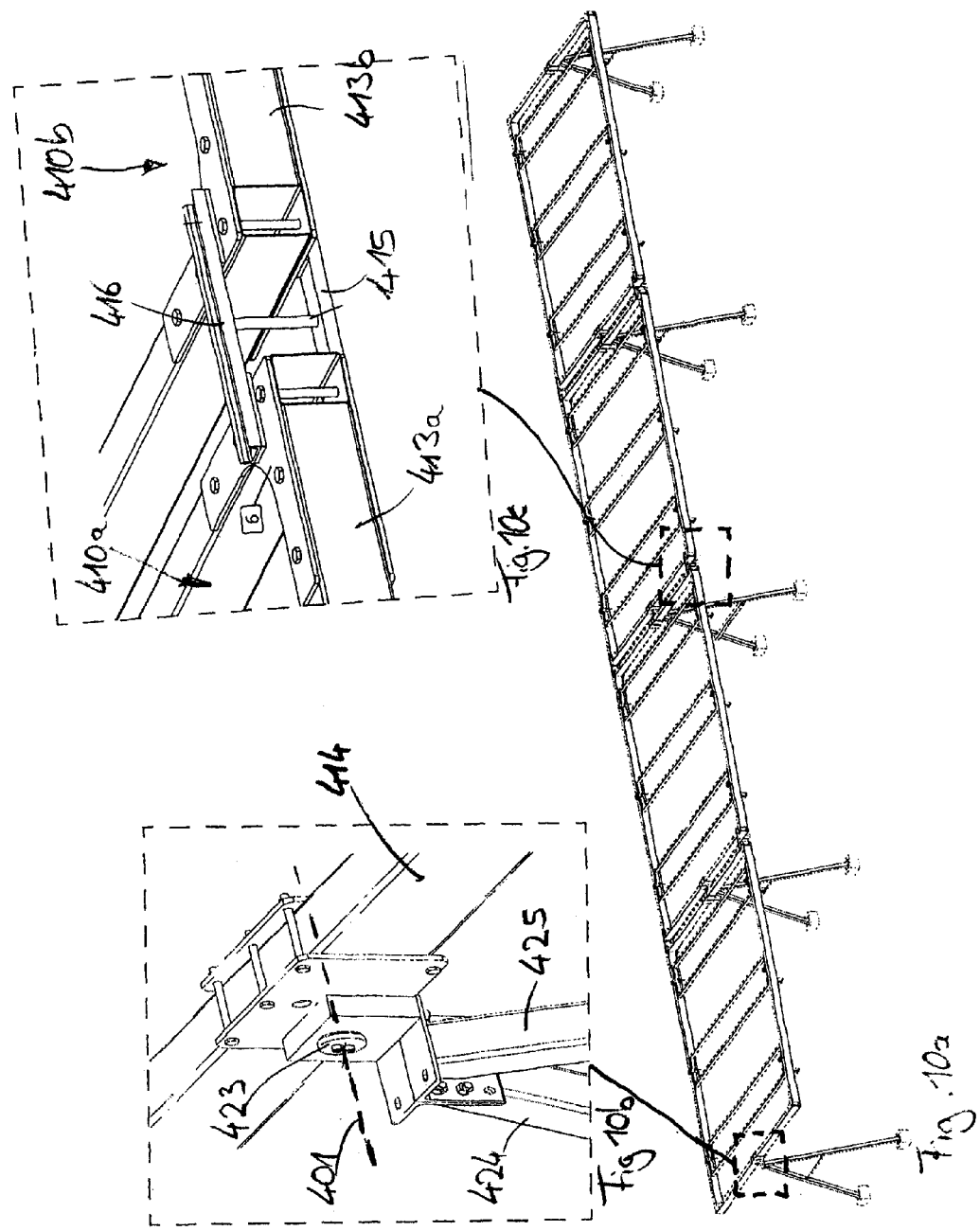

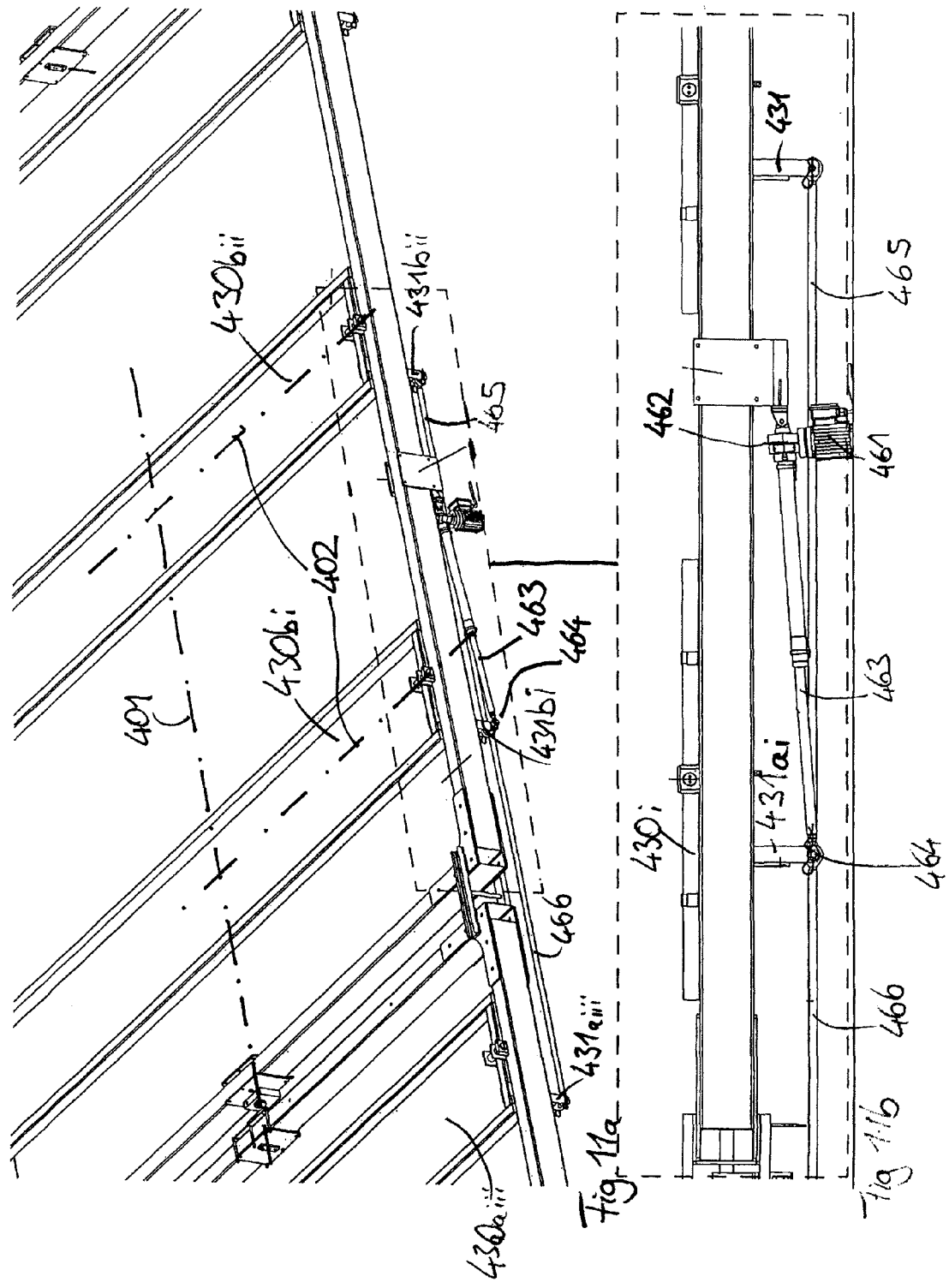

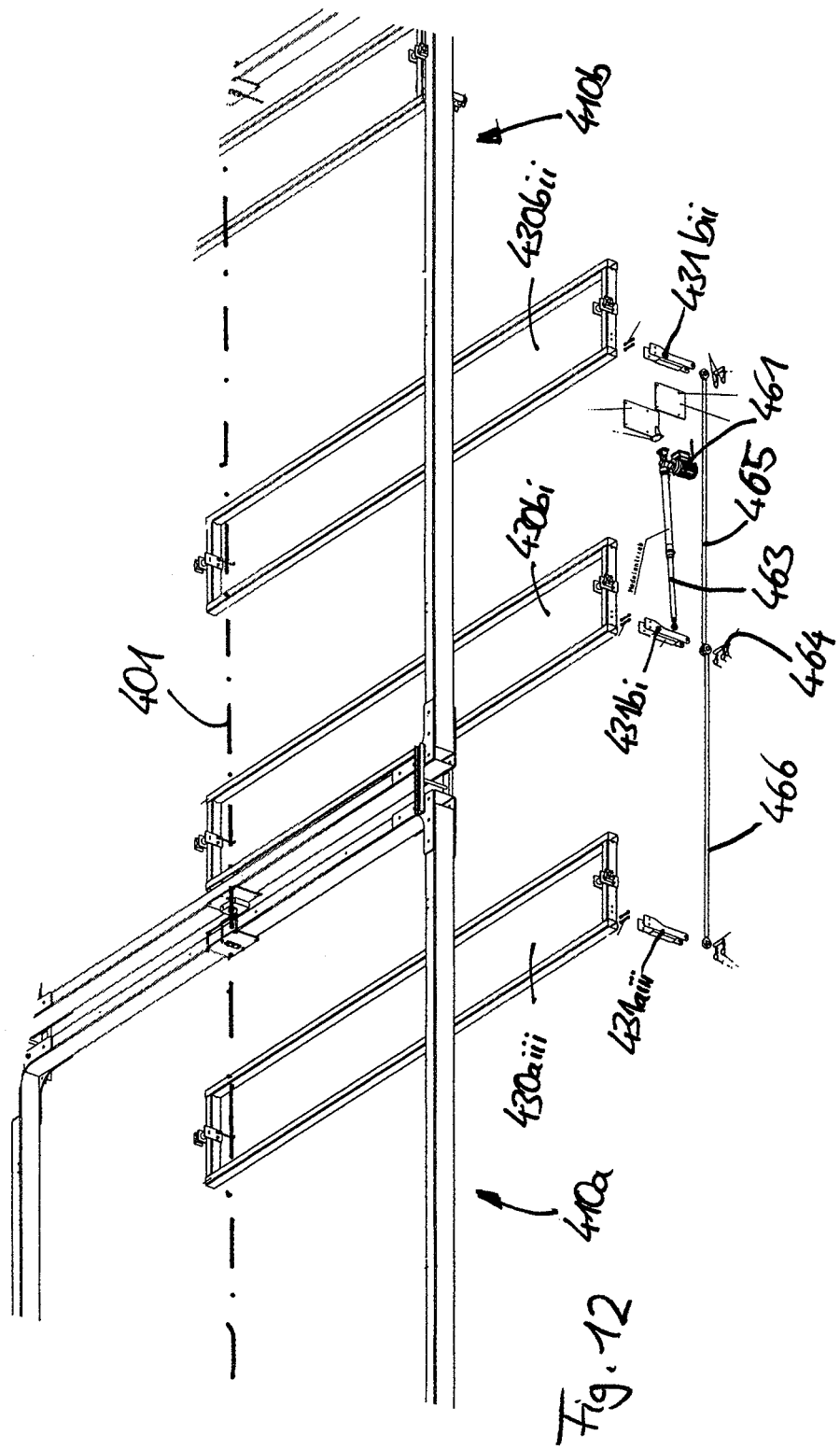

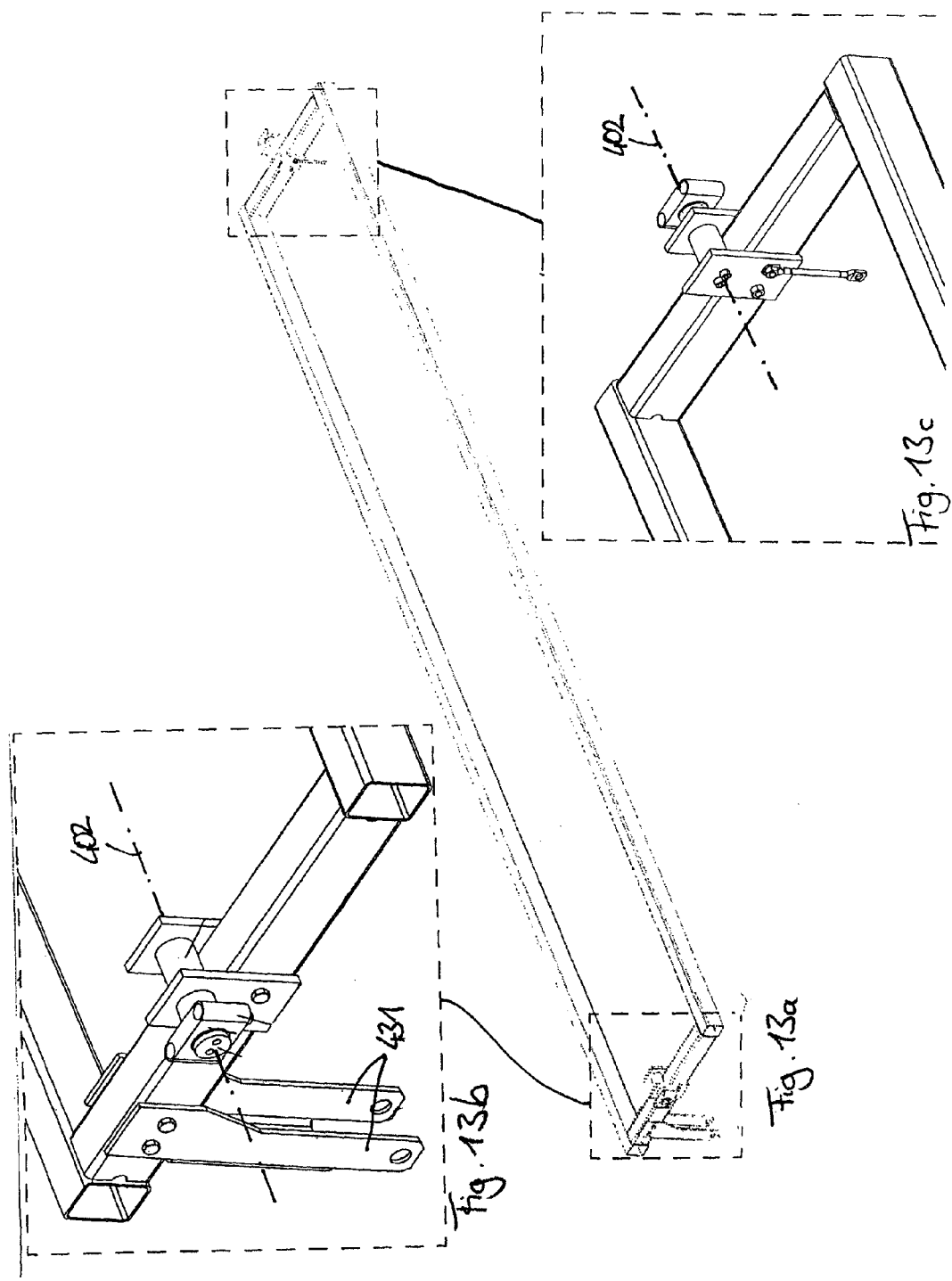

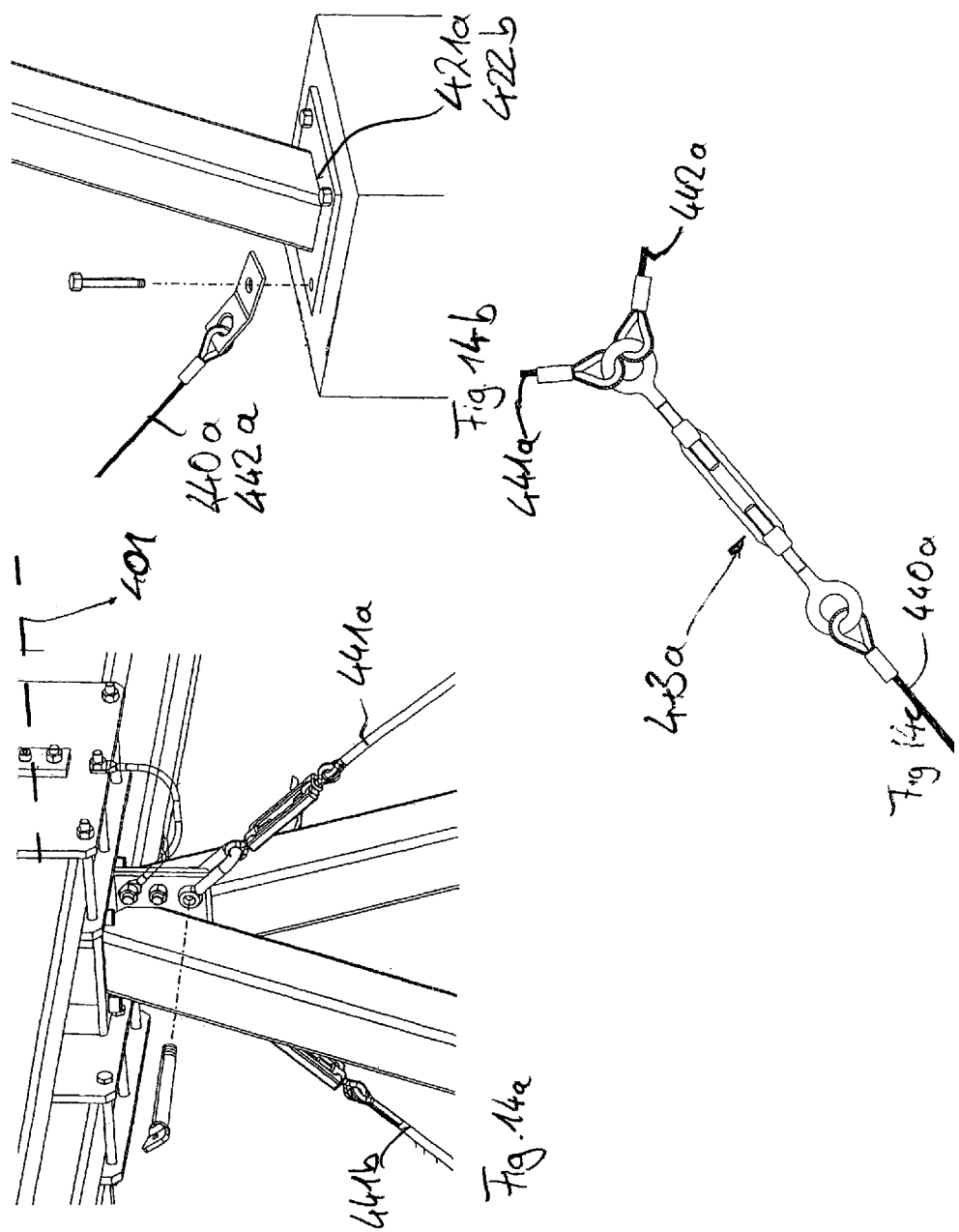

US 8,578,929 B2

MODULAR PIVOTABLE SOLAR COLLECTOR ARRANGEMENT

CROSS-REFERENCE TO RELATED APPLICATIONS

This application is the U.S. National Stage entry under §371 of International Application No. PCT/EP07/05475, filed Jun. 21, 2007, the contents of which are herein disclosed in their entirety.

FIELD OF THE INVENTION

The invention relates to a modular solar collector arrangement for ground attachment. Further, the invention relates to a method for driving such a modular solar collector arrangement and a method for mounting such modular solar collector arrangement.

STATE OF THE ART

Increasing costs for energy, be it electrical or thermal energy, produce the need for efficient energy production from regenerative sources like solar energy. However, a number of specific problems arise when providing solar collector arrangements with high energy output.

From DE 299 20 735 a solar collector support with gimble mounting is known. One single frame is provided for each solar collector panel. However, in this arrangement, it is not possible to provide large-scale solar collector arrangements and this sort of solar collector support is only well suited for mounting to plane surfaces like roofs or the like.

From WO 00/63625 a solar collector and tracker arrangement is provided, wherein each solar collector panel is mounted to a single standing column. A number of such solar collector panels are shown to be coupled for common pivoting around one axis. However, this sort of arrangement requires significant acting force on the couplings and the mounting of the solar collector panels one single support column requires significant dimensions and precision of baseplates. A tracking along a second axis is not disclosed.

DE 199 16 514 A1 discloses a solar collector which can track the sun position. However, the solar collector is only adapted for pivoting the solar collector panels around one single axis. No support stands for mounting the solar collector to an irregular surface are disclosed.

WO 98/03824 discloses a solar concentrator elevational drive mechanism which is pivotal around a first, vertical axis which is concentric with the vertical axis of a single support column supporting the whole solar collector arrangement and is further pivotal around a horizontal axis. No coupling of a number of solar collector panels is disclosed and significant efforts have to be taken to ensure safe mounting of the arrangement to a baseplate.

A first problem associated with such high output solar collector arrangements results from the fact that these arrangements require large ground space area onto which they are mounted. Often, such arrangement extend along multiple hundred meters. Since natural ground surfaces of such extension usually have substantial elevational variations, the solar collector arrangement must be adapted to such elevational variations. This is in particular a problem since solar collector panels usually must track the position of the sun and thus specific pivotal movements are required which would be blocked if such elevational variations would induce internal stresses in the arrangement.

Further, it is required to reduce the material required for construction of such solar collector arrangements to facilitate transportation of the arrangement and to reduce costs. However, this is in particular problematic since for tracking movement the arrangement must resist to any external loads and stresses induced by elevational variations of the ground surface which requires high strength and stiffness of the arrangement.

A further problem associated with high output solar collector arrangements are external loads like forces induced by high wind velocities, large snow volumes resting on the solar collector panels or the like. Such external loads may cause damage to the solar collector arrangement or may hinder or block the tracking of the sun. Thus, there is a need to provide a solar collector arrangement capable to handle such external loads.

Still further, a major problem associated with large scale solar collector arrangements is the building of the baseplates of such arrangements. Usually, the costs for such baseplates have to be kept as low as possible but since stiffness and torsional strength of the whole arrangement depends on the baseplates, this usually is adverse to the cost reduction requirement.

OBJECT OF THE INVENTION

It is a first object of the invention to provide a solar collector arrangement which reduces at least one of the above problems and a respective method of operation. It is a further object of the invention to provide a solar collector arrangement which can be adapted to different dimensions of the ground surface available for its construction quickly and without major constructional changes and a respective method of assembly. Still further it is an object of the invention to provide a solar collector arrangement which can be produced at low costs and ensures safe operation.

These and other objects of the invention are achieved by a modular solar collector arrangement, comprising:

a first supporting stand at a first end of the solar collector arrangement, the first supporting stand extending in vertical direction and having at its upper end a first pivot bearing point defining a pivotal axis extending in longitudinal direction of the solar collector arrangement, the supporting stand further comprising at its lower end at least two first bases being arranged in a distance orthogonal to the longitudinal direction to each other, a second supporting stand at a second end of the solar collector arrangement opposite to the first end in the longitudinal direction, the second supporting stand extending in vertical direction and having at its upper end a second pivot bearing point of the pivotal axis, the supporting stand further comprising at its lower end at least two second bases being arranged in a distance orthogonal to the longitudinal direction to each other, an intermediate supporting stand extending in vertical direction and having at its upper end an intermediate pivot bearing point of the pivotal axis, the intermediate supporting stand further comprising at its lower end at least two intermediate bases being arranged in a distance orthogonal to the longitudinal direction to each other, a first solar collector unit comprising at least one solar collector panel and a first unit frame to which the panel is mounted, the unit frame being pivotally mounted to the first pivot bearing point and an intermediate pivot bearing point, and a second solar collector unit comprising at least one solar collector panel and a second unit frame to which the panel is mounted, the unit frame being pivotally mounted to the second pivot bearing point and an intermediate pivot bearing point a pivotal drive assembly comprising an x-drive unit and an x-coupling coupled between the x-drive unit and at least one unit frame for transferring a pivotal force from the x-drive unit to the unit frame for pivoting the unit frame around an x-axis extending in longitudinal direction of the arrangement, wherein each unit frame is mechanically coupled to its adjacent unit frame to transfer the pivotal force.

A first aspect of the invention is to provide a solar collector arrangement which is composed of a low number of rather simple elements which can be assembled in a modular arrangement. By this, the solar collector arrangement can be adapted to different available ground space conditions and thus the space available can be used very efficiently. Basically, the modular solar collector arrangement comprises a number of at least three supporting stands which are entitled as first and second supporting stands arranged at the ends of the arrangement and one or more intermediate supporting stands which are arranged between the first and second supporting stands. The supporting stands are distanced from each other in one direction and arranged in one straight line thus defining a longitudinal extension direction of the arrangement.

Between each two adjacent supporting stands a solar collector unit is mounted. The solar collector unit may comprise one or more solar collector panels, in a preferred embodiment each solar collector unit may be composed of two or three solar collector panels.

The solar collector units are mounted pivotally to the supporting stands at their upper end. The pivotal axis around which the solar collector units can be rotated to track the position of the sun extends parallel to the longitudinal axis of the arrangement. It is particularly preferred that the pivotal axis intersects the plane defined by the surface of the solar collector panels or is in close relationship to this plane. This will facilitate rotation of the solar collector units around the pivotal axis.

The solar collector arrangement comprises a pivotal drive assembly for rotating the solar collector units around the longitudinal pivotal axis which may be entitled as the x-axis of the arrangement. This pivotal drive assembly is common for at least two solar collector units, preferably for all solar collector units included in the modular solar collector arrangement. By this, individual pivotal drive assemblies for each solar collector unit can be avoided. To achieve synchronous rotation of the solar collector units pivoted by the common pivotal drive assembly each unit frame is mechanically coupled to its adjacent unit frame. Preferably, this mechanical coupling is arranged at a bar of the unit frame of the solar collector unit which is at maximum distance from the pivotal axis to achieve a rigid and strong transfer of torsional loads without the need to provide large and heavy mechanical elements.

According to a first preferred embodiment, the modular solar collector arrangement comprises at least two intermediate supporting stands each extending in vertical direction and having at its upper end an intermediate pivot bearing point of the pivotal axis, each intermediate supporting stand further comprising at its lower end at least two intermediate bases being arranged in a distance orthogonal to the longitudinal direction to each other, wherein between each two adjacent intermediate supporting stands an intermediate solar collector unit is mounted comprising at least one solar collector panel and an intermediate unit frame to which the solar collector panel is mounted, the unit frame being pivotally mounted to the intermediate pivot bearing points of the adjacent intermediate supporting stands around the x-axis. By this the length of the solar collector arrangement in the longitudinal direction can be extended by introducing additional intermediate supporting stands and respective solar collector units.

According to a further preferred embodiment, each solar collector panel is pivotally mounted to the supporting stand for rotation around a second axis extending orthogonal to the longitudinal axis of the solar collector arrangement and wherein an y-drive unit is provided for pivoting the solar collector panels around the second axis.

Whereas in some particular applications it may be sufficient to track the sun position by only pivoting the solar collector panels around the longitudinal axis of the arrangement it is usually required that each solar collector panel is pivotally mounted within the solar collector unit for rotation around an y-axis which is inclined or perpendicular to the x-axis and wherein a pivotal drive assembly (461, 462, 463) is provided for pivoting the solar collector panels around the y-axis. By this, the ideal tracking position wherein the surface normal of the solar collector panels is directed to the sun and thus solarization reaches the panels exactly perpendicular to their collecting surface can be achieved.

According to the arrangement of the solar collector panels of the invention, preferably a number of solar collector panels is comprised in one solar collector unit frame which is pivotal around the longitudinal x-axis. Within this unit frame, each solar collector panel is pivotally mounted to be pivotal around an y-axis which is arranged perpendicular to the longitudinal x-axis. Thus, in case of a plurality of solar collector panels, a respective number of y-axes is provided which are distanced from each other in a longitudinal direction. It is to be understood, that the y-axis itself is pivoted with the unit frame around the x-axis, if the unit frame is rotated. By this, a stiff and lightweight construction can be provided wherein the drive unit for the pivotal movement around the longitudinal x-axis is mounted to a supporting stand and can be provided as a common drive unit for all unit frames and can be dimensioned respectively. Since all solar collector units are coupled and conduct the same rotational movement around the longitudinal x-axis, it is further possible to provide one common y-drive unit which is able to rotate all solar collector panels around their y-axis. For this purpose, the solar collector panels are coupled to each other to transfer the driving force of the y-drive unit from one solar collector panel to the others.

Still further, it is preferred to provide y-coupling means for coupling the solar collector panels to each other for synchronous rotation around the second axis. These y-coupling means comprise tension or compression bars or may comprise an electrical coupling of a plurality of y-drive units or a combination thereof.

Still further, it is preferred that the x-axis is oriented horizontally and the y-axis is pivotal around the x-axis to allow lightweight construction and a high range of motion.

Preferably, the x-axis and the y-axis intersect thus achieving low acting forces are required for pivoting the solar collector panels.

Still further, the x-axis and/or the y-axis are preferably arranged in the plane of the solar collector panels or adjacent to this plane or in or adjacent to the center of gravity of the solar collector panels. This will further lower the actuation forces significantly and decrease weight of supporting structures.

It is particularly preferred that the x-drive unit is a rotational drive unit and the x-coupling means comprise a gear coupled to the rotational drive unit, a chain engaging the gear, the first end of the chain being coupled to a unit frame at a first position, the second end of the chain being coupled to said unit frame at a second position, wherein first and second position are in a distance to each other in orthogonal direction to the longitudinal axis of the solar collector arrangement. By this, a strong but lightweight x-drive unit can be provided which is capable to transfer high torsional forces and is insensitive to environmental influences like dust, snow, rain or the like.

In such an embodiment, it is particularly preferred that the chain is guided in a curved rail extending along a half circle which center is arranged close to or in said longitudinal axis. This arrangement allows to transfer substantial loads via the chain of the x-drive unit and protects the chain from slipping off the gear.

According to a further preferred embodiment, each frame unit comprises at least one longitudinal bar extending in longitudinal direction and being arranged in a distance to said longitudinal pivotal axis, the frame units being coupled by coupling means connecting the longitudinal bars of two adjacent frame units. By this, the torsional forces induced by the x-drive unit when rotating the frame units and the loads induced by external forces can be transmitted safely from one frame unit to another frame unit and this transmission is effected by a lightweight construction being arranged at a significant distance from the longitudinal pivotal axis.

The modular solar collector arrangement can be further improved by providing a tensional mounting arrangement having

- a first tensional element bent from a base of a first supporting stand to a tensional joint,
- a second tensional element bent from an intermediate base of an intermediate supporting stand adjacent to the first supporting stand to the tensional joint, wherein said base of the intermediate supporting stand is on the opposite side of said base of the first supporting stand,
- a third tensional element bent from a mounting point adjacent to the pivot bearing of said intermediate base to the tensional joint.

This preferred embodiment addresses a particular problem arising in large-scale solar collector arrangements. The inventor of the application has recognized that it is not desirable to introduce significant horizontal forces into the baseplate of such a solar collector arrangement. In contrast, preferably only vertical forces should act onto the baseplate to allow a lightweight construction of the baseplate. However, since the dimensions of the solar collector arrangement extend horizontally in a large scale and significant horizontal forces may act upon specific parts of the arrangement, it is a difficult task to avoid horizontal forces acting on the baseplate without significantly limiting the range of motion of the solar collector panels or increasing the weight of the arrangement.

According to the invention, this problem is solved by a specific construction comprising the before-mentioned supporting stands and solar collector units and further a specific arrangement of tensional elements. Since tensional elements are not suspected to buckling, they can be dimensioned very lightweight and effect a significant improvement in load distribution and load transfer to the baseplate. According to the invention, a set of three tension elements is bent between two adjacent supporting stands in such a manner to provide a specific diagonal tensional stiffening. Two bases of the supporting stands are involved, one of each supporting stands and being arranged opposite to each other and further, a mounting point close to the pivot bearing of one of the supporting stands is involved thus resulting in a plane defied by the tensional elements with triangular arrangement of the mounting points of the tensional mounting arrangement.

It is particularly preferred in this embodiment to further improve the arrangement by providing a fourth tensional element bent from a mounting point adjacent to the pivot bearing of said intermediate base to a second tensional joint, a fifth tensional element bent from the second tensional joint to a base of said intermediate supporting stand, said base being arranged opposite to said base to which said second tensional element is mounted, a sixth tensional element bent from a base of a second or intermediate supporting stand adjacent to said intermediate supporting stand to the tensional joint.

It is to be understood, that this tensional mounting arrangement may be repeated to enforce the whole solar collector arrangement. For this purpose, the three tensional elements constituting the tensional enforcement between two supporting stands may be repeated on the other side of any supporting stand as described previously.

It is particularly preferred, to provide the tensional enforcement in such a way, that the tensional elements are mounted to the basis of the end-sided supporting stands and are repeated three times, thus resulting in a solar collector arrangement comprising a total of five supporting stands and four tensional enforcements between each two adjacent supporting stands.

It is particularly preferred that said tensional elements are ties, ropes or wires or the like to provide strong but lightweight properties.

According to a further important preferred embodiment, a control unit is provided, the control unit being adapted to receive positional data from at least one positional sensor indicating the position of the solar collector panels and to send signals to the x-drive unit and, if present, the y-drive unit to orient the solar collector panels for tracking the position of the sun. With this preferred embodiment, a common control unit is provided for controlling the tracking movement of the solar collector panels. Such a control unit may be provided for one single solar collector arrangement which is placed as a single device. In case that a number of such solar collector arrangement is provided, only one common control unit may be provided to send signals for tracking the sun position to each of the x-drive units and y-drive units of the solar collector arrangements.

It is particularly preferred that said positional sensor is a gravity sensor. This embodiment allows to simply detect the position of one solar collector panel and other solar collector panels coupled to this using a sensor which is insensitive to environmental influence and able to detect any pivotal movement around the x- or y-axis. Still further, the direction of gravity can be used directly for calculation of the optimum orientation of the solar collector panel since astronomical calculations can be based thereupon.

Still further it is preferred that the control unit is adapted to detect shadowing effects on parts of any solar collector panel and includes a calculation unit which is adapted to calculate an optimized orientation of the solar collector panels taking into account the position of the sun and the amount of shaded surface parts of the solar collector panels. This improved embodiment acknowledges that maximum power output is not always achieved when the surface of the solar collector panels is oriented perpendicular to irradiation of the sun. In specific situations, in particular short after sunrise and short before sunset, significant parts of the solar collector panels may be shaded and will thus not produce significant power output. In such cases it will be beneficial to abstain from an exact perpendicular orientation in order to minimize the shaded area. Optimum orientation can be calculated using an optimization procedure and using such procedure and outputting respective driving signals to the x-drive unit and the y-drive unit will significantly increase the power output of the solar collector arrangement in times close to sunrise and sunset.

Still further, it is preferred to improve the modular solar collector in that said control unit is adapted to receive load data from at least one load sensor, said load data indicating a load to the solar collector panels induced by external forces like wind or snow and wherein said control unit comprises a comparator to compare said load data with predetermined load limits and the control unit is adapted to send signals to the x-drive unit and, if present, the y-drive unit to drive the solar collector panels in a park position wherein the external loads are minimised. Heavy wind and snow conditions often bear the risk of serious damage to solar collector arrangements and thus it is preferred to monitor any loads resulting from such environmental conditions and to rotate the solar collector panels in a position, wherein such loads are minimised. With regard to loads resulting from winds such a position may be an exact horizontal orientation of the planes of the solar collector panels. In case of heavy snow loads, it is desirable to have an inclination of the solar collector panels which is greater than 45°, in particular than 60°, since in such inclination angle the snow load will usually slip of and thus not incur any loads further.

Still further it is preferred that said control unit is adapted to calculate the optimum position of the solar collector panels based on astronomical data, a clocked movement of the x- and y-drive units and/or an optimisation routine of the power output of the panels comparing at least two different orientations of the panels. These calculation routines or combinations of these routines are effective for optimizing power output of solar collector arrangements. The skilled person will notice that such routines may be combined with the optimization routine discussed previously to prevent shading of significant surface areas of the solar collector panels.

According to a second aspect of the invention a method for operating a solar collector arrangement is provided, the method comprising the steps:
mechanically coupling a number of solar collector panels in such a way that their movement and position with regard to a horizontal y-axis is synchronous,
mechanically coupling the number of solar collector panels in such a way that their movement and position with regard to a horizontal x-axis is synchronous,
detecting the position of at least one solar collector panel, in particular by detecting the direction of gravity with reference to a surface of the solar collector panel,
determining a position of the solar collector panels which produces maximum power output,
enabling an x-drive unit coupled to the solar collector panels to move the solar collector panels to the optimum position with reference to the x-axis, and
enabling an y-drive unit coupled to the solar collector panels to move the solar collector panels to the optimum position with reference to the y-axis.

The method may preferably be conducted using a solar collector arrangement as discussed beforehand. The method allows for cost-efficient and reliable operation of a solar collector arrangement. It is particular useful for large-scale solar collector arrangements to reduce the number of parts required for tracking the position of the sun and calculating the optimum orientation of the solar collector panels.

The method may be further improved by the steps of:
detecting an external load acting onto at least one solar collector panel,
comparing the external load to an upper load limit,
enabling the x-drive unit and/or the y-drive unit coupled to the solar collector panels to move the so drive the solar collector panels to a park position wherein the external load is reduced.

With this, any damages or operational errors can be prevented resulting from such external loads by moving the solar collector panels in a safe park position which may be an exact horizontal position to reduce wind loads or a significantly inclined position to reduce snow loads or any other position which is suitable to reduce specific external loads resulting from forces acting onto the solar collector arrangement.

Further improving the above-described preferred embodiment, the method according the invention may comprise the steps:
i. driving the solar collector panels in an optimum position for optimum power output after a predetermined time after the park position was reached,
ii. detecting the external load during the driving process and comparing it to the upper load limit,
iii. keeping the optimum position if the external load is below the upper load limit or
iv. driving the solar collector panels back to the park position if the external load exceeds the upper load limit, whereafter the process starts at step i) again.

By this, it is not required to manually start the sun-tracking again after a park position was reached but the operation method will frequently check whether the external loads are reduced, e.g. because the snow load slipped off or the wind speed decreased and will start regular operation as soon as no critical external loads occur anymore.

Additionally or alternatively to this, the external load may be detected by measuring at least one wind parameter, in particular the velocity and direction of the wind and/or an amount of snow acting onto a surface of predetermined seize. Such meteorological data will be helpful to provide an estimation of possibly increase or decrease of the external loads and thus allow for a well-timed restart of the sun-tracking procedure.

According to a third aspect of the invention, a method for assembling a solar collector arrangement is provided, the method comprising the steps:
building a first and a second end baseplate,
building at least one intermediate baseplate,
wherein the baseplates are distanced from each other in longitudinal direction of the solar collector arrangement,
mounting first, second and intermediate bases of vertically extending first, second and intermediate supporting stands to each of the baseplates, respectively,
mounting horizontally extending unit frames to pivot bearings arranged at the upper end of each supporting stand between each two adjacent supporting stands, each unit frame supporting at least one solar collector panel,
mounting at least one first tension device bent between a mounting point in a region of a first base of a first supporting stand and a region of a pivot bearing of an intermediate supporting stand adjacent to the first supporting stand.

This method according to the invention addresses the object that for cost-efficient operation it is particularly useful to quickly assemble solar collector arrangements. Still further, with the method for assembling according to the invention a high degree of safety against failure of the construction is reached because only a limited number of assembling steps have to be conducted and these assembling steps are close to be fail-safe against wrong assembling order.

It is particularly preferred that each baseplate is built by building a pair of baseplate blocks distanced from each other in a direction perpendicular to the longitudinal direction, and wherein one of two bases of a supporting stand is placed on each baseplate block. This will significantly reduce the costs and time required for building the baseplate of the solar collector arrangement. According to this embodiment, the baseplate is divided into a number of single baseplate blocks, wherein each block is provided for one base of a supporting stand. This assembling method is particularly useful when applying it to a solar collector arrangement as discussed above since the specific construction and enforcement, in particular when including the tensional enforcement elements, allows for such individual baseplate blocks instead of one single but huge baseplate extending along the whole solar collector arrangement.

Still further, it is preferred that mounting the tension device comprises the steps of:
 bending a first tensional element from a first base of a first supporting stand to a tensional joint,
 bending a second tensional element from a base of an intermediate supporting stand adjacent to the first supporting stand to the tensional joint,
 wherein said base of the intermediate supporting stand is on the opposite side of said base of the first supporting stand,
 bending a third tensional element from a mounting point adjacent to the pivot bearing of said intermediate base to the tensional joint.

The previously discussed preferred embodiment may be further improved in that a second tension device is mounted by the steps of:
 bending a fourth tensional element from a mounting point adjacent to the pivot bearing of said intermediate base to a second tensional joint,
 bending a fifth tensional element from the second tensional joint to a base of said intermediate supporting stand, said base being arranged opposite to said base to which said second tensional element is mounted,
 first base of a first supporting stand to a tensional joint,
 bending a sixth tensional element from a base of a second or intermediate supporting stand adjacent to said intermediate supporting stand to the tensional joint,
 wherein said base of said second or intermediate supporting stand is on the opposite side of said base of said first supporting stand.

With reference to the two above-referenced preferred embodiments it is referred to the previously discussed preferred embodiment of the solar collector arrangement comprising such first, second and third tensional elements or fourth, fifth and sixth tensional elements. In particular, such tensional elements are provided between each two adjacent supporting stands.

Finally, it is preferred to further provide the steps of
 mounting a common x-drive unit for pivoting the unit frames around the pivotal axis, the common drive unit being in particular arranged in a central position of the solar collector arrangement, and
 coupling each two adjacent unit frames at using a coupling element connecting the outer frame beams of the unit frames.

By this, only one drive unit is required to provide pivotal movement around the longitudinal axis and thus the costs and weight of the whole arrangement is significantly reduced.

BRIEF DESCRIPTION OF THE FIGURES

Preferred embodiments of the invention are described with reference to the accompanying figures, wherein FIG. 1a: shows a perspective view of a first embodiment of a solar collector arrangement according to the invention, FIG. 1b: shows a front view of the embodiment according to FIG. 1a, FIG. 1c: shows a top view of the embodiment of FIG. 1a, FIG. 2: shows a perspective exploded view of the embodiment of FIG. 1a, FIGS. 3a-c: show views according to FIGS. 1a-c of a second embodiment of a solar collector arrangement according to the invention, FIGS. 4a-c: show views according to FIGS. 1a-c of a third embodiment of a solar collector arrangement according to the invention, FIG. 5: shows a solar collector unit as marked in FIG. 3c in dotted lines included in the first and second embodiment of the solar collector arrangement, FIG. 6: shows a solar collector unit as marked in FIG. 4c in dotted lines included in the third embodiment of the solar collector arrangement, FIG. 7: shows a side view of a solar collector arrangement according to the three embodiments of FIGS. 1-4, FIG. 8: shows a detailed side view of a pivotal drive assembly for the x-axis as included in all three embodiments of FIGS. 1-4, FIG. 9a: shows a perspective detailed view of the upper securing point of the assembly shown in FIG. 5, FIG. 9b: shows a perspective detailed view of the assembly of FIG. 5, FIG. 10a: shows a perspective view of the first embodiment according to FIGS. 1a-c, FIG. 10b: shows a detailed perspective view as marked in FIG. 10a of a pivot bearing of one supporting stand, FIG. 10c: shows a detailed perspective view as marked in FIG. 10a of a coupling connecting to solar collector unit as marked in FIG. 10a, FIG. 11a: shows a detailed perspective view of pivotal drive assembly for the y-axis, FIG. 11b: is a detailed backside view showing the assembly of FIG. 11a, FIG. 12: is a perspective exploded view of two solar collector units and three solar collector panels and a pivotal drive assembly for these solar collector panels, FIG. 13a: is a perspective, detailed view of a single solar collector panel, FIG. 13b: is a detailed perspective view as marked in FIG. 13a of the coupling point to the y-coupling means of the assembly of FIG. 11a, FIG. 13c: is a detailed perspective view as marked in FIG. 13a of the pivot bearing around the y-axis, FIG. 14a: is a detailed perspective view of the mounting point adjacent to the pivot bearing around the longitudinal axis of the tensional mounting arrangement, FIG. 14b: is a detailed perspective view of a securing point of the tensional mounting arrangement at a base of a supporting stand, and FIG. 14c: is a detailed perspective view of a tensional joint.

DETAILED DESCRIPTION OF THE FIGURES

Figure 9A:
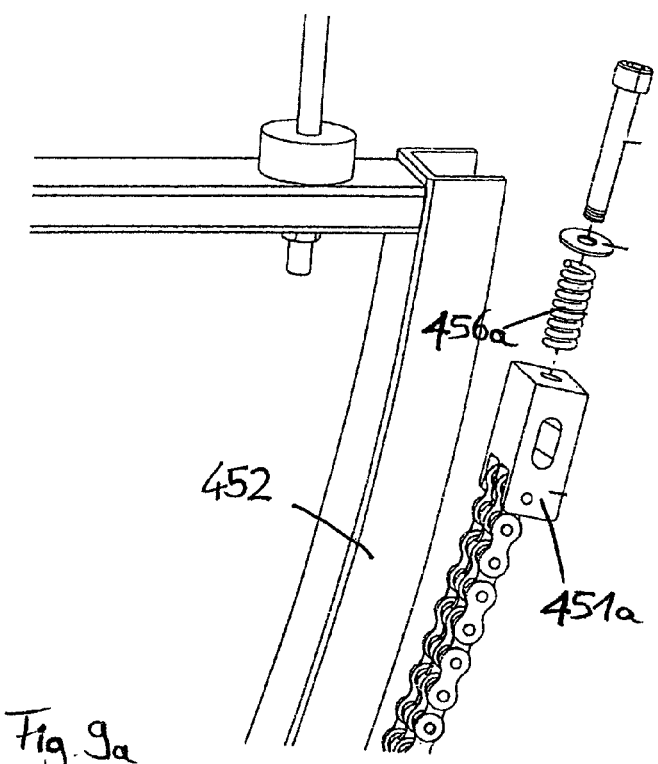
Figure 9B:
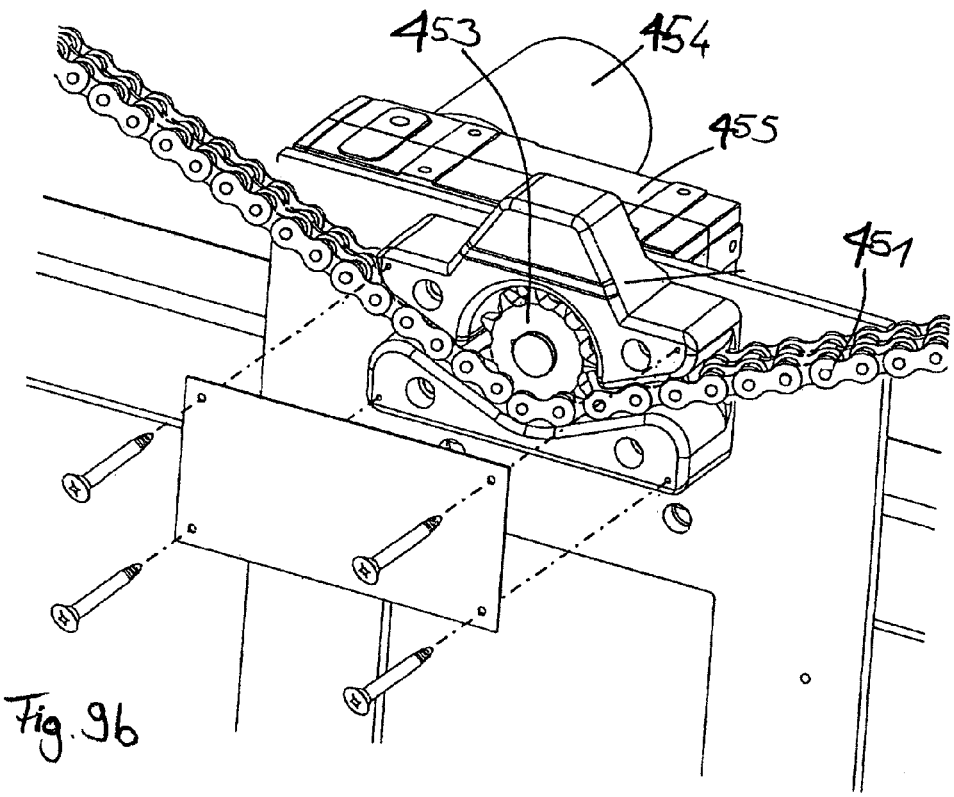

Referring first to FIGS. 1a-c and FIG. 2, a solar collector arrangement is shown comprising a total of 12 solar collector panels.

The solar collector arrangement comprises a first, end-sided supporting stand 120a comprising two vertical posts 124a, 125a in triangular arrangement converging to the top and connected at their tops to support a pivotal bearing 123a. At the bottom of each post 124a, 125a a base 121a, 122a is arranged, respectively. Each base 121a, 122a is fixed to a baseplate block (not shown) by screws or the like.

The whole solar collector arrangement extends in a longitudinal direction along a longitudinal pivotal x-axis entitled with reference number 101.

In a distance in longitudinal direction to the first supporting stand 120a an intermediate supporting stand 120b is positioned. Further, second and third intermediate supporting stands 120c, 120d are arranged in a distance in longitudinal direction and a second, end-sided supporting stand 120e is arranged on the opposite end side. Thus, a total of five supporting stands 120a-e are provided, each supporting stand being designed substantially in the same way.

Between each two adjacent supporting stands a solar collector unit 110a-d is mounted at their upper end. Solar collector units 110a-d are rotatably coupled to the pivotal bearings of the supporting stands 120a-e and are shown in FIGS. 1a-c in their horizontal orientation.

Each solar collector unit 110a comprises a total of three solar collector panels 130ai-iii, 1306i-iii as illustrated in FIGS. 1a-c for the left side solar collector units 110a, b.

The supporting stands are fixed with their bases to the baseplate blocks. Further, each two adjacent supporting stands are connected by a tensional mounting arrangement. The basic design of the tensional mounting arrangement will be explained referring to the tensional mounting arrangement between supporting stands 120a, b, c.

A first tensioning rope 140a is fixed to the front-sided base 121a of the first supporting stand 120a. The first tensioning rope 140a extends upwards and in a longitudinal direction across the space below the solar collector unit 110a to a tensional joint 143a which is arranged approximately at medium height below the longitudinal pivotal axis. A second tensioning rope 142a is fixed to the back-sided base 122b of the intermediate supporting stand 120b and extends to the tensional joint 143a whereto it is fixed as well. A third tensioning rope 141a is fixed close to the pivotal bearing of the intermediate supporting stand 120b and extends to the tensional joint 143a whereto it is fixed as well. By this specific arrangement a significant increase of stiffness and strength of the construction is reached without adversely affecting the range of motion of the solar collector unit 110a and the solar collector panels 130ai-iii mounted thereto.

As can be further seen from FIGS. 1a-c, the tensional mounting arrangement between intermediate supporting stand 120b and intermediate supporting stand 120c is bent in such a way that a third tensioning rope 141b is bent between the pivotal bearing of supporting stand 120b and the tensional joint 143b arranged adjacent to this intermediate supporting stand 120b in the same distance like the tensional joint 143a. A second tensioning rope 142b is fixed to the front-sided base 121b of intermediate supporting stand 120b and a first tensioning rope 140b is fixed to the back-sided base 122c of intermediate supporting stand 120c both tensioning ropes being secured to the tensional joint 143b at their opposite ends.

The tensional mounting arrangement between intermediate supporting stand 121c and d is designed in the same manner as that between first supporting stand 120a and the tensional mounting arrangement between intermediate supporting stand 121d is designed in the same manner as that between supporting stand 120b and c.

As can be seen, all tensional mounting arrangements extend diagonally across the space below the solar collector units and are bent from the front left side to the back right side. In alternating arrangement, the tensional mounting arrangement are bent from bottom left to top right and top left to bottom right, thus resulting in only each second intermediate supporting stand having two securing points close to their pivotal bearing.

A pivotal drive assembly 150 for pivoting the solar collector units including all solar collector panels mounted thereto around the longitudinal x-axis is arranged in the center region of the solar collector arrangement and mounted to the intermediate supporting stand 120c.

A pivotal drive assembly 160 for pivoting the solar collector panels around the y-axis 102 is arranged in approximately the center region of the solar collector arrangement and mounted to the solar collector unit 110c.

Referring now to FIGS. 3a-c, a second embodiment according to the invention comprises a first supporting stand 220a, a second supporting stand 220c and an intermediate supporting stand 220b. Further, solar collector units 210a, b are mounted between each two adjacent supporting stands, each solar collector unit including three solar collector panels 230ai-iii, 230bi-iii. The design of solar collector arrangement 200 corresponds to a cut-out of supporting stands 120b, c, d of FIG. 1a wherein supporting stands 120b, d correspond to first and second supporting stands 220a-c and intermediate supporting stands 120c corresponds to intermediate supporting stand 220b. As can be seen from the figures, all tensional elements are fixed to the bases of the intermediate supporting stand to not limit the range of motion of the pivotal drive assembly for the x-axis mounted to this supporting stand.

A pivotal drive assembly 250 for pivoting the solar collector units 210a, b around the longitudinal x-axis 201 is mounted to intermediate supporting stand 220b and a pivotal drive assembly 260 is mounted to solar collector unit 210b for rotating the solar collector panels around the y-axis 202.

Referring now to FIGS. 4a-c a third embodiment of a solar collector arrangement 300 according to the invention is shown. The solar collector arrangement is almost similar to the solar collector arrangement 100 shown in FIGS. 1a-c and 2 and only the differences will be explained below.

Solar collector arrangement 300 comprises four solar collector units 310a-d wherein each solar collector unit comprises only two solar collector panels 330ai, ii instead of three. Thus, the solar collector arrangement 300 as shown in FIGS. 4a-c comprises a total of eight solar collector panels.

The construction of a solar collector unit according to the first and second embodiment will be explained referring to FIG. 5.

As shown, a solar collector unit 410 comprises a unit frame which is composed of two side bars 411, 413 and a front- and end bar 412, 414. These bars 411-414 define a rectangular unit frame. Sidebars 411, 413 are arranged in parallel to the longitudinal x-axis 401 of the solar collector arrangement. Front and end-bars 412, 414 are arranged in parallel to the y-axes 402 perpendicular to this x-axis.

An end-sided supporting stand 420e is shown on the right-hand side of FIG. 5 and an intermediate supporting stand 420d is shown on the left-hand side of FIG. 5. Each supporting stand 420e, d comprises a pivotal bearing 423d, e defining the longitudinal pivotal x-axis 401.

The unit frame 411-414 is mounted to the pivotal bearings 423e, d and is pivotal around the x-axis 401.

Within the unit frame three solar collector panels 130i-iii are mounted. Each solar collector panel comprises a total of four solar collector modules.

The solar collector panels 430i-iii extend in a direction perpendicular to the x-axis and are mounted to the side-bar 411, 413 via pivotal bearings in such a way that they can rotate around a y-axis 402i-iii. The y-axis 402i-iii is perpendicular to the longitudinal x-axis 401.

Solar collector panels 430i-iii are shown in their horizontal position and in this position the x-axis and the y-axes intersect with the surface plane of the solar collector panels or are at least in close relation with this plane. In each orientation of the solar collector panels, the x- and y-axes intersect, thus enabling a pivoting of the solar collector panel and solar collector unit around the x- and y-axes with low forces. As the skilled person will notice, the x- and y-axes intersect in or close to the center of gravity of each solar collector panel to facilitate pivotal movement of the panels.

FIG. 6 shows a solar collector unit of the third embodiment shown in FIGS. 4a-c. As can be seen, the solar collector unit 310 is different from the solar collector unit 410 of FIG. 5 in that only two solar collector panels 330i, ii are provided, each solar collector panel comprising five solar collector modules.

Referring now to FIGS. 7, 8, 9a, b, a pivotal drive assembly comprises a chain 451 which is guided by a curved rail 152 in a half circle and only a small portion of the chain 451 is outside the rail 452 in the bottom position. In this bottom position the rail 451 intersects with a gear 453 which is driven by an electric motor 454 via a gear box 455.

The motor 454, gear box 455 and gear 453 are secured to an intermediate supporting stand 120. The chain 451 is driven by the gear 453. Chain 451 is of defined length and its first end 451a is arranged upwards and sideways of the gear 453 in the horizontal position shown in the figures. The first end 451a is fixed to front or end side bar 412, 414 as can be seen from FIG. 5. The other end 451b of the chain 451 is arranged upwards and sideways to the opposite side and fixed to the bar 412, 414 as well.

For the purpose of shock absorbing the ends of the chain 451 are coupled via a spring 456a as shown in FIG. 9a.

The motor 454 may rotate the gear 453 in clockwise direction thus translating the chain 451 to the left direction so that either the end 451a lowers and the end 451b raises its position or, if gear 453 rotates counter clockwise, the end 451a will raise its position whereas the end 451b will lower its position. By this, the solar collector units can be pivoted around the x-axis in the desired way.

FIGS. 10a-c show details of the construction, in particular the pivotal coupling of the solar collector units to the supporting stands and the coupling of the solar collector units to each other. As can be seen from FIG. 10a, a pivotal bearing 423 is arranged on the top of the posts 124, 125 and defines an x-axis 401 intersecting through a front bar 414.

As can be seen from FIG. 10c, the solar collector units are coupled using two short u-profiles 415, 416. The u-profiles 415, 416 clamp the side-bars 413a, 413b of the unit frames of two adjacent solar collector units 410a, b. By this, the coupling between two solar collector units is disposed at the outer most position in relation to the x-axis 401, thus allowing to significantly reduce the dimension of the u-profiles 415, 416, since high torsional loads can be transferred with low forces acting on these u-profiles and the coupling itself.

As can be seen from FIG. 10c, the two coupling members 415, 416 are arranged on the top and bottom side of the side bars 413a,b to clamp the ends of these bars. A spacer 417 is introduced between the coupling members 415, 416. Coupling members are rigidly fixed only on one side 418 to the side bars 413a,b, whereas on the respective other side 419 of the coupling members there is only a loose, formlocking connection provided. This allows to compensate torsional stresses in the whole arrangement resulting from external loads or elevational variations of the ground and prevents breakage of parts of the arrangement.

Referring now to FIGS. 11a, b, 12 and 13a-c, a pivotal drive assembly for pivoting the solar collector panels around the y-axis is shown.

The pivotal drive assembly 460 comprises an electric motor 461 which is connected to a side-bar 413 of a unit frame of one solar collector unit arranged in or close to the middle of the whole solar collector arrangement.

Motor 461 is coupled to linear actuator 463 via a gear to produce a translational movement when rotating the gear 562 via the motor 461.

The rod 463 is coupled to a first connecting joint 464. The first connecting joint is further coupled to a first lever 431ai fixed to a first solar collector panel 430bi.

Further, the first connecting joint 464 is coupled via a first coupling rod 465 to a second lever 431bii which is fixed to a second solar collecting panel 430bii. A second coupling rod 466 extends to the left-hand side and is coupled to a third lever 431aiii connected to a further solar collector panel 430aiii.

The skilled person will notice that further connecting rods will be mounted to couple other solar collector panels to the toothed rod 463. As will be further noticed, coupling rod 466 bridges two adjacent solar collector units so that the pivotal movement of all solar collector panels of the arrangement can be conducted synchronous by one single common drive assembly 461, 462, 463 and respective coupling rods.

FIG. 14a shows the securing point of two tensioning ropes 441a, b close to the pivotal bearing of the longitudinal x-axis of the arrangement. As can be seen, the securing points are in a small distance from the longitudinal pivotal axis 401 close below this axis.

FIG. 14b shows the mounting of a tensioning rope 440a or 442a to a base 421a or 422b of a supporting stand.

FIG. 14c shows a tensional joint 443a joining a first tensioning rope 440a, a second tensioning rope 442a and a third tensioning rope 441a and allowing to apply a tensional force to these three tensioning ropes by turning the middle section 444a of the joint 443a.

The invention claimed is:

1. Modular solar collector arrangement, comprising:
    a first supporting stand (220a) at a first end of the solar collector arrangement, the first supporting stand extending in vertical direction and having at its upper end a first pivot bearing point (223a) defining a pivotal axis (201) extending in longitudinal direction of the solar collector arrangement, the supporting stand further comprising at its lower end at least two first bases (221, 222a) being arranged in a distance orthogonal to the longitudinal direction to each other,
    a second supporting stand (220c) at a second end of the solar collector arrangement opposite to the first end in the longitudinal direction, the second supporting stand extending in vertical direction and having at its upper end a second pivot bearing point of the pivotal axis, the supporting stand further comprising at its lower end at least two second bases being arranged in a distance orthogonal to the longitudinal direction to each other,
    an intermediate supporting stand (220b) extending in vertical direction and having at its upper end an intermediate pivot bearing point of the pivotal axis, the intermediate supporting stand further comprising at its lower end at least two intermediate bases being arranged in a distance orthogonal to the longitudinal direction to each other,
    a first solar collector unit (210a) comprising at least one solar collector panel (230ai) and a first unit frame to which the panel is mounted, the unit frame being pivotally mounted to the first pivot bearing point and an intermediate pivot bearing point, and a second solar collector unit (210b) comprising at least one solar collector panel (230bi) and a second unit frame to which the panel is mounted, the unit frame being pivotally mounted to the second pivot bearing point and an intermediate pivot bearing point a pivotal drive assembly (250) comprising an x-drive unit (254) and an x-coupling coupled between the x-drive unit and at least one unit frame for transferring a pivotal force from the x-drive unit to the unit frame for pivoting the unit frame around an x-axis (101; 201; 401) extending in longitudinal direction of the arrangement, wherein each unit frame is mechanically coupled to its adjacent unit frame to transfer the pivotal force;

a tensional mounting arrangement having:

a first tensional element (140a) bent from a base of a first supporting stand to a tensional joint (143a), a second tensional element (142a) bent from an intermediate base of an intermediate supporting stand adjacent to the first supporting stand to the tensional joint, wherein said base of the intermediate supporting stand is on the opposite side of said base of the first supporting stand, a third tensional element (141a) bent from a mounting point adjacent to the pivot bearing of said intermediate base to the tensional joint, a fourth tensional element (141a) bent from a mounting point adjacent to the pivot bearing of said intermediate base to a second tensional joint (143b), a fifth tensional element (142b) bent from the second tensional joint to a base of said intermediate supporting stand, said base being arranged opposite to said base to which said second tensional element (142a) is mounted, a sixth tensional element (1406b) bent from a base of a second or intermediate supporting stand adjacent to said intermediate supporting stand to the tensional joint, wherein said base of said second or intermediate supporting stand is on the opposite side of said base of said first supporting stand.

2. Modular solar collector arrangement according to claim 1, comprising at least two intermediate supporting stands (120b, c) each extending in vertical direction and having at its upper end an intermediate pivot bearing point of the pivotal axis, each intermediate supporting stand further comprising at its lower end at least two intermediate bases being arranged in a distance orthogonal to the longitudinal direction to each other, wherein between each two adjacent intermediate supporting stands an intermediate solar collector unit (110b) is mounted comprising at least one solar collector panel and an intermediate unit frame to which the solar collector panel is mounted, the unit frame being pivotally mounted to the intermediate pivot bearing points of the adjacent intermediate supporting stands around the x-axis (101; 401).

3. Modular solar collector arrangement according to claim 1, wherein each solar collector panel is pivotally mounted within the solar collector unit for rotation around an y-axis (102; 402) which is inclined or perpendicular to the x-axis (101; 401) and wherein a pivotal drive assembly (461, 462, 463) is provided for pivoting the solar collector panels around the y-axis (102; 402).

4. Modular solar collector arrangement according to claim 3, further comprising y-coupling means (465, 466, 431bi, 431bii, 431aiii) for coupling the solar collector panels to each other for synchronous rotation around the second axis.

5. Modular solar collector arrangement according to claim 3, wherein the x-axis (101; 401) is oriented horizontally and the y-axis (102; 402) is pivotal around the x-axis (101; 401).

6. Modular solar collector arrangement according to claim 3, wherein the x-axis (101; 401) and the y-axis (102; 402) intersect.

7. Modular solar collector arrangement according to claim 3, wherein the x-axis (101; 401) and/or the y-axis (102; 402) are arranged in the plane of the solar collector panels or adjacent to this plane or in or adjacent to the center of gravity of the solar collector panels.

8. Modular solar collector arrangement according to claim 1, wherein the x-drive unit is a rotational drive unit and the x-coupling means comprise a gear coupled to the rotational drive unit, a chain (451) engaging the gear, the first end (451a) of the chain being coupled to a unit frame at a first position, the second end (451b) of the chain being coupled to said unit frame at a second position, wherein first and second position are in a distance to each other in orthogonal direction to the longitudinal axis of the solar collector arrangement.

9. Modular solar collector arrangement according to claim 8, wherein the chain is guided in a curved rail (152) extending along a half circle which center is arranged close to or in said longitudinal axis.

10. Modular solar collector arrangement according to claim 1, wherein each frame unit comprises a longitudinal bar (111, 113) extending in longitudinal direction and being arranged in a distance to said longitudinal pivotal axis, the frame units being coupled by coupling means (415, 416) connecting the longitudinal bars of two adjacent frame units.

11. Modular solar collector arrangement according to claim 1, wherein said tensional elements are ties, ropes or wires.

12. Modular solar collector arrangement according to claim 1, further comprising a control unit, the control unit being adapted to receive positional data from at least one positional sensor indicating the position of the solar collector panels and to send signals to the x-drive unit and, if present, the y-drive unit to orient the solar collector panels for tracking the position of the sun.

13. Modular solar collector arrangement according to the claim 12, wherein said positional sensor is a gravity sensor.

14. Modular solar collector arrangement according to claim 1, wherein the control unit is adapted to detect shadowing effects on parts of the solar collector panel and includes a calculation unit which is adapted to calculate an optimized orientation of the solar collector panels taking into account the position of the sun and the amount of shaded surface parts of the solar collector panels.

15. Modular solar collector arrangement according to claim 12, wherein said control unit is adapted to receive load data from at least one load sensor, said load data indicating a load to the solar collector panels induced by external forces like wind or snow and wherein said control unit comprises a comparator to compare said load data with predetermined load limits and the control unit is adapted to send signals to the x-drive unit and, if present, the y-drive unit to drive the solar collector panels in a position wherein the external loads are minimised.

16. Modular solar collector arrangement according to claim 1, wherein said control unit is adapted to calculate the optimum position of the solar collector panels based on astronomical data, a clocked movement of the x- and y-drive units and/or an optimization routine of the power output of the panels comparing at least two different orientations of the panels.

17. Method for operating a solar collector arrangement, comprising the steps:
   mechanically coupling a number of solar collector panels in such a way that their movement and position with regard to a horizontal y-axis (102; 402) is synchronous,
   mechanically coupling the number of solar collector panels in such a way that their movement and position with regard to a horizontal x-axis (101; 401) is synchronous,
   detecting the position of at least one solar collector panel, in particular by detecting the direction of gravity with reference to a surface of the solar collector panel,
   determining a position of the solar collector panels which produces maximum power output,
   enabling an x-drive unit coupled to the solar collector panels to move the solar collector panels to the optimum position with reference to the x-axis (101; 401), and
   enabling an y-drive unit coupled to the solar collector panels to move the solar collector panels to the optimum position with reference to the y-axis (102; 402)
   wherein mounting the tension device comprises the steps of:
      bending a first tensional element from a first base of a first supporting stand to a tensional joint,
      bending a second tensional element from a base of an intermediate supporting stand adjacent to the first supporting stand to the tensional joint, wherein said base of the intermediate supporting stand is on the opposite side of said base of the first supporting stand,
      bending a third tensional element from a mounting point adjacent to the pivot bearing of said intermediate base to the tensional joint,
      bending a fourth tensional element from a mounting point adjacent to the pivot bearing of said intermediate base to a second tensional joint,
      bending a fifth tensional element from the second tensional joint to a base of said intermediate supporting stand, said base being arranged opposite to said base to which said second tensional element (142*a*) is mounted, and
      bending a sixth tensional element from a base of a second or intermediate supporting stand adjacent to said intermediate supporting stand to the second tensional joint, wherein said base of said second or intermediate supporting stand is on the opposite side of said base of said first supporting stand.

18. Method according to claim 17, comprising the steps:
   detecting an external load acting onto at least one solar collector panel,
   comparing the external load to an upper load limit,
   enabling the x-drive unit and/or the y-drive unit coupled to the solar collector panels to move the so drive the solar collector panels to a park position wherein the external load is reduced.

19. Method according to claim 18, comprising the steps:
   i. driving the solar collector panels in an optimum position for optimum power output after a predetermined time after the park position was reached,
   ii. detecting the external load during the driving process and comparing it to the upper load limit,
   iii. keeping the optimum position if the external load is below the upper load limit or
   iv. driving the solar collector panels back to the park position if the external load exceeds the upper load limit, whereafter the process starts at step i) again.

20. Method according to claim 18, wherein the external load is detected by measuring at least one wind parameter, in particular the velocity and direction of the wind and/or an amount of snow acting onto a surface of predetermined seize.

21. The method of claim 17, further comprising a method for assembling the solar collector arrangement, comprising the steps:
   building a first and a second end baseplate,
   building at least one intermediate baseplate,
   wherein the baseplates are distanced from each other in longitudinal direction of the solar collector arrangement,
   mounting first, second and intermediate bases of vertically extending first, second and intermediate supporting stands to each of the baseplates, respectively,
   mounting horizontally extending unit frames to pivot bearings arranged at the upper end of each supporting stand between each two adjacent supporting stands, each unit frame supporting at least one solar collector panel, and
   mounting at least one first tension device bent between a mounting point in a region of a first base of a first supporting stand and a region of a pivot bearing of an intermediate supporting stand adjacent to the first supporting stand.

22. A method according to claim 21, wherein each baseplate is built by building a pair of baseplate blocks distanced from each other in a direction perpendicular to the longitudinal direction, and wherein one base is placed on each baseplate block.

23. A method according to claim 21 further comprising the steps of:
   mounting a common x-drive unit for pivoting the unit frames around the pivotal axis, the common drive unit being in particular arranged in a central position of the solar collector arrangement, and
   coupling each two adjacent unit frames at using a bracket connecting the outer frame beams of the unit frames.

* * * * *

UNITED STATES PATENT AND TRADEMARK OFFICE
CERTIFICATE OF CORRECTION

PATENT NO. : 8,578,929 B2
APPLICATION NO. : 12/665646
DATED : November 12, 2013
INVENTOR(S) : Bernd Krabbe, Raphael Hoffmann and Stephan Kipper It is certified that error appears in the above-identified patent and that said Letters Patent is hereby corrected as shown below:

In the Claims

In claim 18, column 18, line 2, please delete "move the so";
In claim 20, column 18, line 19, please delete "seize" and insert --size--.

Signed and Sealed this
Eighth Day of April, 2014

Michelle K. Lee
*Deputy Director of the United States Patent and Trademark Office*